United States Patent
Kutsuna et al.

(10) Patent No.: US 12,469,269 B2
(45) Date of Patent: Nov. 11, 2025

(54) MEDICAL DATA PROCESSING DEVICE PERFORMING PROCESSING USING A COMPLEX-NUMBER NEURAL NETWORK

(71) Applicant: CANON MEDICAL SYSTEMS CORPORATION, Tochigi (JP)

(72) Inventors: Hideaki Kutsuna, Kawasaki (JP); Hidenori Takeshima, Kawasaki (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 522 days.

(21) Appl. No.: 17/660,922

(22) Filed: Apr. 27, 2022

(65) Prior Publication Data
US 2022/0375209 A1 Nov. 24, 2022

(30) Foreign Application Priority Data
Apr. 28, 2021 (JP) .................................. 2021-076826

(51) Int. Cl.
*G06V 10/82* (2022.01)

(52) U.S. Cl.
CPC .......... *G06V 10/82* (2022.01); *G06V 2201/03* (2022.01)

(58) Field of Classification Search
CPC ............................ G06V 10/82; G06V 2201/03
USPC ........................................................ 382/128
See application file for complete search history.

(56) References Cited

U.S. PATENT DOCUMENTS

2019/0378270 A1* 12/2019 Ida .................... A61B 5/055
2020/0042873 A1* 2/2020 Daval Frerot ......... G06N 3/048

FOREIGN PATENT DOCUMENTS

JP 2019-525325 A 9/2019
WO WO 2018/013200 A1 1/2018

OTHER PUBLICATIONS

Extended European Search Report issued Sep. 19, 2022 in European Patent Application No. 22170532.0, 8 pages.
Dedmari, M.A., et al., "Complex Fully Convolutional Neural Networks for MR Image Reconstruction", Jul. 9, 2018 (Jul. 9, 2018), pp. 1-9, XP055959163, Retrieved from the Internet: URL :https://arxiv.org/pdf/1807.03343.pdf [retrieved on Sep. 8, 2022].
Trabelsi, C. et al "Deep Complex Networks" International Conference on Learning Representations, 2018. 19 pages.
Virtue, Patrick M., "Complex-valued Deep Learning with Applications to Magnetic Resonance Image Synthesis," Electrical Engineering and Computer Sciences University of California at Berkeley: Technical Report No. UCB/EECS2018-130. Aug. 19, 2019. XP093215306. 154 pages.
European Office Action issued Oct. 21, 2024 in European Patent Application No. 22170532.0, 13 pages.
European Office Action issued Jan. 4, 2024 in European Patent Application No. 22 170 532.0, 8 pages.

(Continued)

*Primary Examiner* — Gabriel I Garcia
(74) *Attorney, Agent, or Firm* — Oblon, McClelland, Maier & Neustadt, L.L.P.

(57) ABSTRACT

A medical data processing device according to an embodiment includes a processing circuit. The processing circuit applies a linear calculation of a complex number coefficient and a non-linear activation not dependent on an argument of complex numbers, to medical data having a complex value.

19 Claims, 9 Drawing Sheets

(56) References Cited

OTHER PUBLICATIONS

Marseet, A. et al., "Application of Complex-Valued Convolutional Neural Network for Next Generation Wireless Networks," 2017 IEEE Western New York Image and Signal Processing Workshop (WNYISPW), May 10, 2018, XP093114433, pp. 1-5.

Barrachina, J., "Code Issues 9 Pull requests Discussions Actions Projects," GitHub, Apr. 22, 2021, XP093114481, 12 pages, URL <https://github.com/NEGU93/cvnn/commit/dc4eb022d2b395cc41454f269b53fab6a7b998af>.

Japanese Office Action issued Dec. 11, 2024 in Japanese Patent Application No. 2021-076826, 5 pages.

* cited by examiner

MEDICAL DATA PROCESSING DEVICE PERFORMING PROCESSING USING A COMPLEX-NUMBER NEURAL NETWORK

CROSS-REFERENCE TO RELATED APPLICATIONS

This application is based upon and claims the benefit of priority from Japanese Patent Application No. 2021-076826, filed on Apr. 28, 2021; the entire contents of which are incorporated herein by reference.

FIELD

Embodiments described herein relate generally to a medical data processing device, a data processing device, and a medical data processing method.

BACKGROUND

In machine learning employing neural networks, real-number neural networks are used as a standard.

However, in medical data processing devices for magnetic resonance imaging apparatuses, ultrasound diagnosis apparatuses, and the like, because signal processing using complex numbers is often used, it is expected that using a complex-number neural network will make a wide range of application possible.

DETAILED DESCRIPTION

Figure 1:
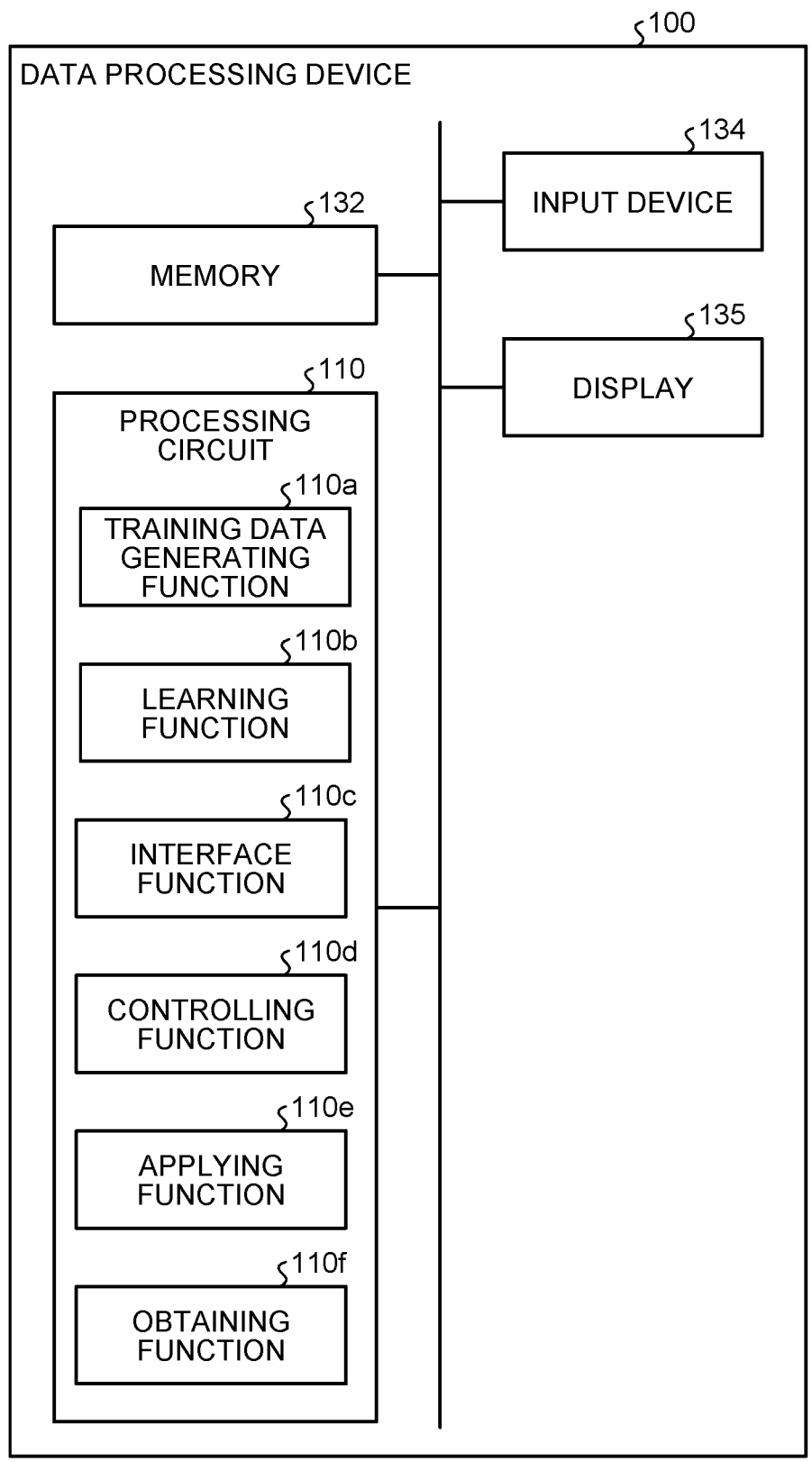
FIG. 1 is a diagram illustrating an example of a data processing device according to an embodiment.

A medical data processing device provided in at least one aspect of the present disclosure includes a processing circuit. The processing circuit is configured to apply a linear calculation of a complex number coefficient and a non-linear activation not dependent on the argument of complex numbers, to medical data having a complex value.

EMBODIMENTS

In the following sections, exemplary embodiments of a medical data processing device, a data processing device, and a medical data processing method will be explained in detail, with reference to the accompanying drawings.

A configuration of a data processing device 100 according to an embodiment will be explained, with reference to FIG. 1.

The data processing device 100 is a device configured to generate data by using machine learning. In one example, the data processing device 100 is connected to any of various types of medical image diagnosis apparatuses such as the magnetic resonance imaging apparatus illustrated in FIG. 2 or the ultrasound diagnosis apparatus illustrated in FIG. 3, for example, and is configured to process a signal received from the medical image diagnosis apparatus, to generate a trained model, and to implement the trained model. Possible examples of the medical image diagnosis apparatus to which the data processing device 100 can be connected are not limited to magnetic resonance imaging apparatuses and ultrasound diagnosis apparatuses and include other apparatuses such as X-ray Computed Tomography (CT) apparatuses and Positron Emission Tomography (PET) apparatuses, for instance.

Typically, the data processing device 100 is a medical data processing device configured to process medical data; however, possible embodiments are not limited to the example in which the data processing device 100 is a medical data processing device. In another example, the data processing device 100 may be a device configured to process magnetic resonance data that is not medical data.

The data image processing device 100 includes a processing circuit 110, a memory 132, an input device 134, and a display device 135. The processing circuit 110 includes a training data generating function 110a, a learning function 110b, an interface function 110c, a controlling function 110d, an applying function 110e, and an obtaining function 110f.

In the embodiment, the processing functions performed by the training data generating function 110a, the learning function 110b, the interface function 110c, the controlling function 110d, the applying function 110e, and the obtaining function 110f, as well as the trained model (e.g., a neural network) are stored in the memory 132 in the form of computer-executable programs. The processing circuit 110 is a processor configured to realize the functions corresponding to the programs, by reading and executing the programs from the memory 132. In other words, the processing circuit 110 that has read the programs has the functions illustrated within the processing circuit 110 in FIG. 1. Further, the processing circuit 110 that has read the program corresponding to the trained model (the neural network) is capable of performing processes according to the trained model. Further, although the example is explained with reference to FIG. 1 in which the functions of the processing circuit 110 are realized by the single processing circuit, it is also acceptable to structure the processing circuit 110 by combining together a plurality of independent processors, so that the functions are realized as a result of the processors executing the programs. In other words, each of the above-mentioned functions may be structured as a program, so that a single processing circuit is configured to execute each of the programs. Alternatively, a single processing circuit may be configured to realize two or more of the functions of the processing circuit 110. In yet another example, one or more specific functions may be installed in a dedicated and independent program executing circuit.

In FIG. 1, the processing circuit 110, the training data generating function 110*a*, the learning function 110*b*, the interface function 110*c*, the controlling function 110*d*, the applying function 110*e*, and the obtaining function 110*f* are examples of a processing unit, a generating unit, an input unit (a learning unit), a receiving unit, a controlling unit, an applying unit, and an obtaining unit, respectively.

The term "processor" used in the above explanation denotes, for example, a Central Processing Unit (CPU), a Graphical Processing Unit (GPU), or a circuit such as an Application. Specific Integrated Circuit (ASIC) or a programmable logic device (e.g., a Simple Programmable Logic Device [SPLD], a Complex Programmable Logic Device [CPLD], or a Field. Programmable Gate Array [FPGA]). The one or more processors are configured to realize the functions by reading and executing the programs saved in the memory 132.

Further, instead of having the programs saved in the memory 132, it is also acceptable to directly incorporate the programs in the circuitry of the one or more processors. In that situation, the one or more processors realize the functions by reading and executing the programs incorporated in the circuitry thereof. Accordingly, instead of having the trained model saved in the memory 132, for example, it is also acceptable to directly incorporate the program related to the trained model in the circuit of a processor.

Further, when the processing circuit 110 is incorporated in any of various types of medical image diagnosis apparatuses or is configured to perform processes in collaboration with any of various types of medical image diagnosis apparatuses, the processing circuit 110 may have a function to additionally perform processes relevant to these configurations.

By employing the training data generating function 110*a*, the processing circuit 110 is configured to generate training data used for a learning process, on the basis of data and/or images obtained by the interface function 110*c*.

By employing the learning function 110*b*, the processing circuit 110 is configured to generate the trained model, by performing the learning process with the use of the training data generated by the training data generating function 110*a*.

By employing the interface function 110*c*, the processing circuit 110 is configured to obtain, from the memory 132, data, images, and/or the like used in an image generating process performed by the applying function 110*e*.

By employing the controlling function 110*d*, the processing circuit 110 is configured to control overall processes performed by the data processing device 100. More specifically, by employing the controlling function. 110*d*, the processing circuit 110 is configured to control the processes of the data processing device 100, on the basis of various types of setting requests input by an operator via the input device 134, various types of control programs and various types of data read from the memory 132, and/or the like.

Further, by employing the applying function 110*e*, the processing circuit 110 is configured to generate an image on the basis of a result of processes performed by employing the training data generating function 110*a* and the learning function 110*b*. Further, by employing the applying function 110*e*, the processing circuit 110 is configured to apply the trained model generated by the learning function 110*b* to an input image, so as to generate an image on the basis of a result of the application of the trained model.

The memory 132 is structured by using a semiconductor memory element such as a Random Access Memory (RAM) or a flash memory, or a hard disk, an optical disk, or the like. The memory 132 is a memory configured to store therein data such as display-purpose image data generated by the processing circuit 110, training-purpose image data, and the like.

The memory 132 is configured to store therein, as necessary, various types of data such as control programs for performing image processing and displaying processes.

The input device 134 is configured to receive various types of instructions and inputs of information from the operator. For example, the input device 134 is a pointing device such as a mouse and/or a trackball, a selecting device such as a mode changing switch, an inputting device such as a keyboard, and/or the like.

Under control of the controlling function 110*d* or the like, the display device 135 is configured to display, among others, a Graphical User Interface (GUI) used for receiving an input of an image taking condition and images generated by the controlling function 110*d* or the like. For example, the display device 135 is a displaying device such as a liquid crystal display monitor, or the like. The display device 135 is an example of a display unit. The display device 135 includes a mouse, a keyboard, a button, a panel switch, a touch command screen, a foot switch, a trackball, a joystick, and/or the like.

Figure 2:
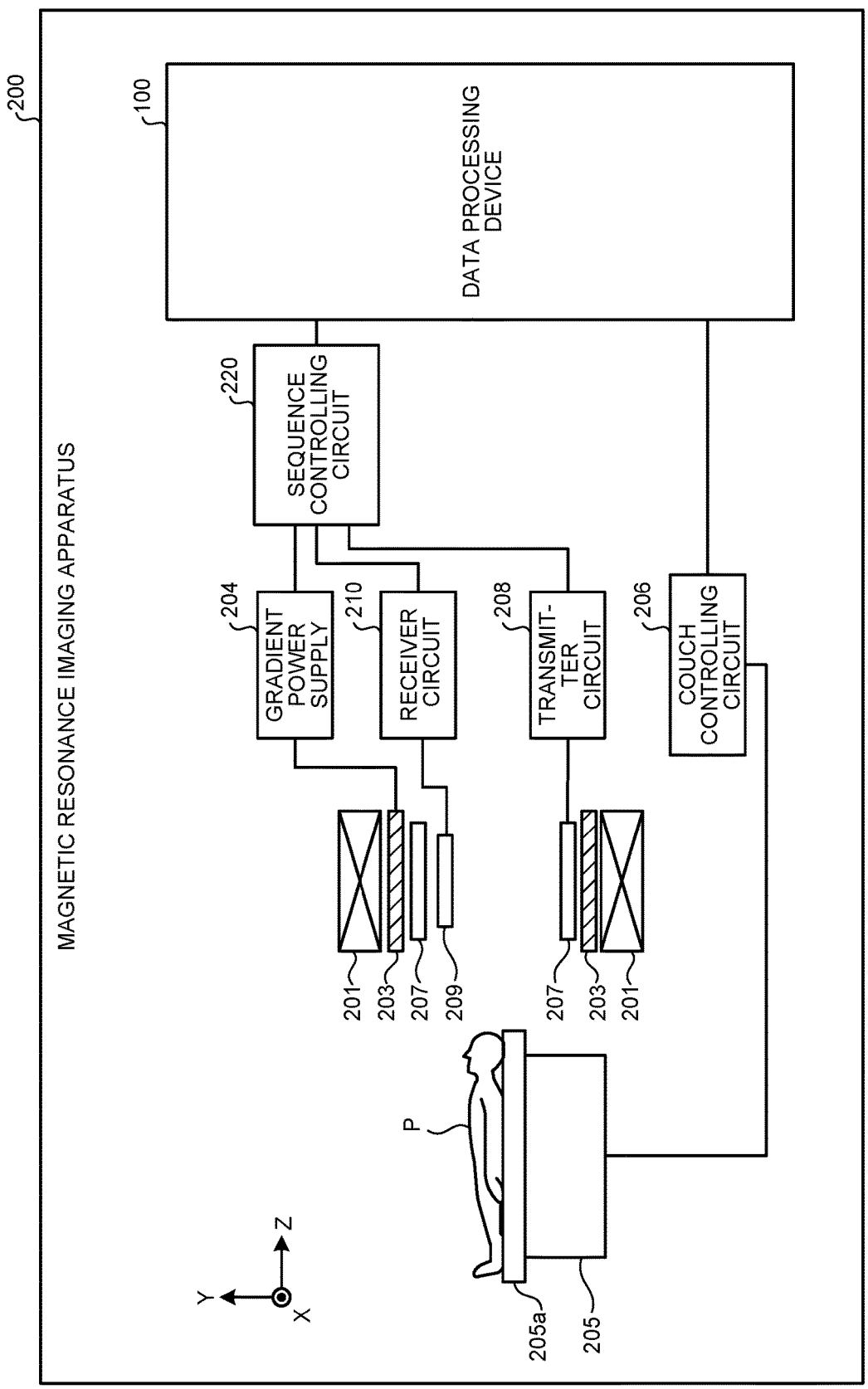
FIG. 2 is a diagram illustrating an example of a magnetic resonance imaging apparatus according to the embodiment.

FIG. 2 illustrates an example of a magnetic resonance imaging apparatus 200 in which the data processing device 100 according the embodiment is incorporated.

As illustrated in FIG. 2, the magnetic resonance imaging apparatus 200 includes a static magnetic field magnet 201, a static magnetic field power source (not illustrated), a gradient coil 203, a gradient power supply 204, a couch 205, a couch controlling circuit 206, a transmitter coil 207, a transmitter circuit 208, a receiver coil 209, a receiver circuit 210, a sequence controlling circuit 220 (a sequence controlling unit), and the data processing device 100 explained with reference to FIG. 1. In this situation, the magnetic resonance imaging apparatus 200 does not include an examined subject (hereinafter, "patient") P (e.g., a human body). Further, the configuration illustrated in FIG. 2 is merely an example.

The static magnetic field magnet 201 is a magnet formed so as to have a hollow substantially circular cylindrical shape and is configured to generate a static magnetic field in a space on the inside thereof. For example, the static magnetic field magnet 201 is a superconductive magnet or the like and is configured to excite magnetism by receiving a supply of an electric current from the static magnetic field power source. The static magnetic field power source is configured to supply the electric current to the static magnetic field magnet 201. In another example, the static magnetic field magnet 201 may be a permanent magnet, and in that situation, the magnetic resonance imaging apparatus 200 does not need to include the static magnetic field power source. Further, the static magnetic field power source may be provided separately from the magnetic resonance imaging apparatus 200.

The gradient coil 203 is a coil formed so as to have a hollow substantially circular cylindrical shape and is arranged on the inside of the static magnetic field magnet 201. The gradient coil 203 is formed by combining together three coils corresponding to X-, Y-, and Z-axes orthogonal to one another. By individually receiving a supply of an electric current from the gradient power supply 204, the three coils are configured to generate gradient magnetic fields of which magnetic field intensities change along the X-, Y-, and Z-axes. The gradient magnetic fields generated along the X-, Y-, and Z-axes by the gradient coil 203 are, for example, a slice gradient magnetic field Gs, a phase-encoding gradient magnetic field Ge, and a read-out gradient magnetic field Gr. The gradient power supply 204 is configured to supply the electric currents to the gradient coil 203.

The couch 205 includes a couchtop 205a on which the patient P is placed and is configured, under control of the couch controlling circuit 206, to insert the couchtop 205a into the hollow (an image taking opening) of the gradient coil 203, while the patient P is place thereon. Usually, the couch 205 is installed so that the longitudinal direction thereof is parallel to the central axis of the static magnetic field magnet 201, Under control of the data processing device 100, the couch controlling circuit 206 is configured to drive the couch 205, so as to move the couchtop 205a in longitudinal directions and up-and-down directions.

The transmitter coil 207 is arranged on the inside of the gradient coil 203 and is configured to generate a radio frequency magnetic field by receiving a supply of a Radio Frequency (RF) pulse from the transmitter circuit 208. The transmitter circuit 208 is configured to supply the RF pulse corresponding to a Larmor frequency determined by the type of targeted atoms and the magnetic field intensity, to the transmitter coil 207.

The receiver coil 209 is arranged on the inside of the gradient coil 203 and is configured to receive a magnetic resonance signal (hereinafter, "MR signal", as necessary) emitted from the patient P due to influence of the radio frequency magnetic field. Upon receipt of the magnetic resonance signal, the receiver coil 209 is configured to output the received magnetic resonance signal to the receiver circuit 210.

The transmitter coil 207 and the receiver coil 209 described above are merely examples it is possible to select one or combine two or more from among: a coil having only the transmitting function; a coil having only the receiving function; and a coil having the transmitting and receiving functions.

The receiver circuit 210 is configured to detect the magnetic resonance signal output from the receiver coil 209 and to generate magnetic resonance data on the basis of the detected magnetic resonance signal. More specifically, the receiver circuit 210 is configured to generate the magnetic resonance data by digitally converting the magnetic resonance signal output from the receiver coil 209. Further, the receiver circuit 210 is configured to transmit the generated magnetic resonance data to the sequence controlling circuit 220. Alternatively, the receiver circuit 210 may be provided for a gantry device which includes the static magnetic field magnet 201, the gradient coil 203, and the like.

The sequence controlling circuit 220 is configured to image the patient P, by driving the gradient power supply 204, the transmitter circuit 208, and the receiver circuit 210, on the basis of sequence information. In this situation, the sequence information is information defining a procedure for performing the imaging process. The sequence information defines: the magnitude of the electric current to be supplied to the gradient coil 203 by the gradient power supply 204 and the timing with which the electric current is to be supplied; the magnitude of the RF pulse to be supplied to the transmitter coil 207 by the transmitter circuit 208 and the timing with which the RF pulse is to be applied; the timing with which the magnetic resonance signal is to be detected by the receiver circuit 210; and the like. For example, the sequence controlling circuit 220 may be an integrated circuit such as an Application Specific Integrated Circuit (ASIC) or a Field. Programmable Gate Array (FPGA) or an electronic circuit such as a Central Processing Unit (CPU) or a Micro Processing Unit (MPU). The sequence controlling circuit 220 is an example of a scanning unit.

Further, upon receipt of the magnetic resonance data from the receiver circuit 210 as a result of imaging the patient P by driving the gradient power supply 204, the transmitter circuit 208, and the receiver circuit 210, the sequence controlling circuit 220 is configured to transfer the received magnetic resonance data to the data processing device 100. In addition to the processes explained with reference to FIG. 1, The data processing device 100 is configured to control the entirety of the magnetic resonance imaging apparatus 200.

Returning to the description of FIG. 1, other processes performed by the data processing device 100 in addition to the processes explained with reference to FIG. 1 will be explained. By employing the interface function 110c, the processing circuit 110 is configured to transmit the sequence information to the sequence controlling circuit 220 and to receive the magnetic resonance data from the sequence controlling circuit 220. Further, upon receipt of the magnetic resonance data, the processing circuit 110 including the interface function 110c is configured to store the received magnetic resonance data into the memory 132.

The magnetic resonance data stored in the memory 132 is arranged in a k-space by the controlling function. 110d. As a result, the memory 132 has stored therein k-space data.

The memory 132 is configured to store therein the magnetic resonance data received by the processing circuit 110 including the interface function 110c, the k-space data arranged in the k-space by the processing circuit 110 including the controlling function. 110d, the image data generated by the processing circuit 110 including a generating function (or the applying function 110e), and the like.

By employing the controlling function 110d, the processing circuit 110 is configured to control the entirety of the magnetic resonance imaging apparatus 200 and to control imaging processes, image generating processes, image displaying processes, and the like. For example, the processing circuit 110 including the controlling function 110d is configured to receive the input of the image taking condition (an imaging parameter, etc.) through the GUI and to generate the sequence information according to the received image taking condition. Further, the processing circuit 110 including the controlling function 110 is configured to transmit the generated sequence information to the sequence controlling circuit 220.

By employing the generating function (not illustrated in FIG. 1) (or employing the applying function 110e), the processing circuit 110 is configured to generate a magnetic resonance image by reading the k-space data from the memory 132 and performing a reconstructing process such as a Fourier transform on the read k-space data.

Figure 3:
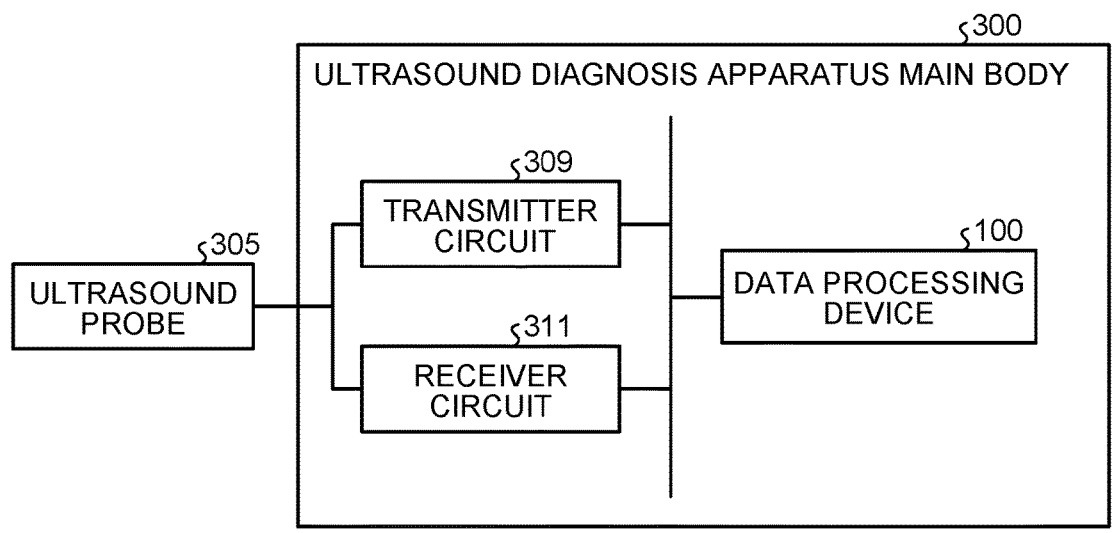
FIG. 3 is a diagram illustrating an example of an ultrasound diagnosis apparatus according to the embodiment.

FIG. 3 illustrates an exemplary configuration of an ultrasound diagnosis apparatus 300 in which the data processing device 100 according to the embodiment is incorporated. The ultrasound diagnosis apparatus according to the embodiment includes an ultrasound probe 305 and an ultrasound diagnosis apparatus main body 300. The ultrasound diagnosis apparatus main body 300 includes a transmitter circuit 309, a receiver circuit 311, and the data processing device 100 described above.

The ultrasound probe 305 includes a plurality of piezoelectric transducer elements. The plurality of piezoelectric transducer elements are configured to generate an ultrasound wave on the basis of a drive signal supplied from the transmitter circuit 309 included in the ultrasound diagnosis apparatus main body 300 (explained later). Further, the plurality of piezoelectric transducer elements included in the ultrasound probe 305 are configured to receive a reflected wave from the patient P and to convert the reflected wave into an electrical signal (a reflected-wave signal). Further, the ultrasound probe 305 includes a matching layer provided for the piezoelectric transducer elements, a backing member that prevents the ultrasound wave from propagating rearward from the piezoelectric transducer elements, and the like. In the present example, the ultrasound probe 305 is detachably connected to the ultrasound diagnosis apparatus main body 300. Further, the ultrasound probe 305 is an example of a scanning unit.

When an ultrasound wave is transmitted from the ultrasound probe 305 to the patient P, the transmitted ultrasound wave is repeatedly reflected on a surface of discontinuity of acoustic impedances at a tissue in the body of the patient P and is received as the reflected wave by the plurality of piezoelectric transducer elements included in the ultrasound probe 305 so as to be converted into the reflected-wave signal. The amplitude of the reflected-wave signal is dependent on the difference between the acoustic impedances on the surface of discontinuity on which the ultrasound wave is reflected. When a transmitted ultrasound pulse is reflected on the surface of a moving blood flow, a cardiac wall, or the like, the reflected-wave signal is, due to the Doppler effect, subject to a frequency shift, depending on a velocity component of the moving members with respect to the ultrasound wave transmission direction.

The ultrasound diagnosis apparatus main body 300 is an apparatus configured to generate ultrasound image data on the basis of the reflected-wave signal received from the ultrasound probe 305. The ultrasound diagnosis apparatus main body 300 is an apparatus capable of generating two-dimensional ultrasound image data on the basis of a two-dimensional reflected-wave signal and capable of generating three-dimensional ultrasound image data on the basis of a three-dimensional reflected-wave signal. It should be noted, however, that the embodiment is also applicable to the situation where an ultrasound diagnosis apparatus 300 is an apparatus dedicated for two-dimensional data.

As illustrated in FIG. 3, the ultrasound diagnosis apparatus 300 includes the transmitter circuit 309, the receiver circuit 311, and the data image processing device 100.

The transmitter circuit 309 and the receiver circuit 311 is configured to control the ultrasound transmission and reception performed by the ultrasound probe 305, on the basis of an instruction from the data processing device 100 including the controlling function. The transmitter circuit 309 includes a pulse generator, a transmission delay unit, a pulses, and the like and is configured to supply the drive signal to the ultrasound probe 305. The pulse generator is configured to repeatedly generate a rate pulse used for forming a transmission ultrasound wave at a predetermined Pulse Repetition Frequency (PRF). Further, the transmission delay unit is configured to apply a delay time period that corresponds to each of the piezoelectric transducer elements and is required to converge the ultrasound wave generated from the ultrasound probe 305 into the form of a beam and to determine transmission directionality, to each of the rate pulses generated by the pulse generator. The pulser is configured to apply the drive signal (a drive pulse) to the ultrasound probe 305 with timing based on the rate pulses.

In other words, the transmission delay unit is configured to arbitrarily adjust the transmission direction of the ultrasound wave transmitted from the surface of the piezoelectric transducer elements, by varying the delay time period applied to each of the rate pulses. Further, the transmission delay unit is configured to control the position of a focal point (a transmission focus) in the depth direction of the ultrasound transmission, by varying the delay time period applied to each of the rate pulses.

Further, the receiver circuit 311 includes an amplifying circuit, an Analog/Digital (A/D) converter, a reception delay circuit, an adder, a quadrature detection circuit, and the like and is configured to generate a reception signal (reflected-wave data) by performing various types of processes on the reflected-wave signal received from the ultrasound probe 305. The amplifying circuit is configured to amplify the reflected-wave signal for each of the channels and to perform a gain correcting process. The A/D converter is configured to perform an A/D conversion on the gain-corrected reflected-wave signals. The reception delay circuit is configured to apply a reception delay time period required to determine reception directionality, to the digital data. The adder is configured to perform an adding process on the reflected-wave signals to which the reception delay time period has been applied by the reception delay circuit. As a result of the adding process by the adder, a reflection component from a direction corresponding to the reception directionality of the reflected-wave signals is emphasized. Further, the quadrature detection circuit is configured to convert an output signal from the adder into an In-phase signal (an I signal) and a Quadrature-phase signal (a Q signal) in a baseband. After that, the quadrature detection circuit is configured to transmit the I signal and the Q signal (hereinafter, "IQ signals") to the processing circuit 110, as the reception signal (the reflected-wave data). Alternatively, the quadrature detection circuit may convert the output signal from the adder into a Radio Frequency (RF) signal so as to transmit the RF signal to the processing circuit 110. The IQ signals and the RF signal each serve as a reception signal including phase information.

When a two-dimensional region in the patient P is to be scanned, the transmitter circuit 309 is configured to cause an ultrasound beam for scanning the two-dimensional region to be transmitted from the ultrasound probe 305. Further, the receiver circuit 311 is configured to generate a two-dimensional reception signal from a two-dimensional reflected-wave signal received from the ultrasound probe 305. As another example, when a three-dimensional region in the patient P is to be scanned, the transmitter circuit 309 is configured to cause an ultrasound beam for scanning the three-dimensional region to be transmitted from the ultrasound probe 305. Further, the receiver circuit 311 is configured to generate a three-dimensional reception signal from a three-dimensional reflected-wave signal received from the ultrasound probe 305. The receiver circuit 311 is configured to generate the reception signal on the basis of the reflected-wave signal and to transmit the generated reception signal to the processing circuit 110.

The transmitter circuit 309 is configured to cause the ultrasound probe 305 to transmit the ultrasound beam, from a predetermined transmission position (a transmission scanning line). In a predetermined reception position (a reception scanning line), the receiver circuit 311 is configured to receive, from the ultrasound probe 305, a signal derived from the reflected wave of the ultrasound beam transmitted by the transmitter circuit 309. When parallel simultaneous reception is not performed, the transmission scanning line and the reception scanning line are the same scanning line. In contrast, when parallel simultaneous reception is performed, when the transmitter circuit 309 causes the ultrasound probe 305 to transmit an ultrasound beam corresponding to a single session from one transmission scanning line, the receiver circuit 311 is configured to simultaneously receive, via the ultrasound probe 305, signals based on the reflected wave derived from the ultrasound beam which the transmitter circuit 309 caused the ultrasound probe 305 to transmit, in a plurality of predetermined reception positions (reception scanning lines) as a plurality of reception beams.

The data processing device 100 is connected to the transmitter circuit 309 and the receiver circuit 311 and is configured, in addition to the functions already explained with reference to FIG. 1, to process signals received from the receiver circuit 311, to control the transmitter circuit 309, to generate the trained model, co implement the trained model, and to perform various image processing processes. In addition to the functions already explained with reference to FIG. 1, the processing circuit 110 includes a B-mode processing function, a Doppler processing function, a generating function, and the like. In the following sections, the description of FIG. 1 will be resumed so as to describe a configuration which the data processing device 100 may have in addition to the configuration already explained with reference to FIG. 1, while the data processing device 100 is incorporated in the ultrasound diagnosis apparatus 300.

The processing functions performed by the B-mode processing function, the Doppler processing function, and the generating function, as well as the trained model are stored in the memory 132 in the form of computer-executable programs. The processing circuit 110 is a processor configured to realize the functions corresponding to the programs, by reading and executing the programs from the memory 132. In other words, the processing circuit 110 that has read the programs has these functions.

The B-mode processing function and the Doppler function are examples of a B-mode processing unit and a Doppler processing unit, respectively.

The processing circuit 110 is configured to perform various types of signal processing processes on the reception signal received from the receiver circuit 311.

By employing the B-mode processing function, the processing circuit 110 is configured to receive data from the receiver circuit 311 and to generate data (B-mode data) in which signal intensities are expressed as levels of brightness, by performing a logarithmic amplifying process, an envelope detecting process, a logarithmic compressing process, and/or the like.

Further, by employing the Doppler processing function, the processing circuit 110 is configured to obtain velocity information from the reception signal (the reflected-wave data) received from the receiver circuit 311 by performing a frequency analysis and to generate data (Doppler data) obtained by extracting moving member information such as velocity, dispersion, power, and the like under the Doppler effects, with respect to multiple points.

In this situation, the B-mode processing function and the Doppler processing function are capable of processing both the two-dimensional reflected-wave data and the three-dimensional reflected-wave data.

Further, by employing the controlling function 110d, the processing circuit 110 is configured to control overall processes performed by the ultrasound diagnosis apparatus. More specifically, by employing the controlling function 110d, the processing circuit 110 is configured to control processes performed by the transmitter circuit 309, the receiver circuit 311, and the processing circuit 110, on the basis of various types of setting requests input by the operator via the input device 134 and various types of control programs and various types of data read from the memory 132. Further, by employing the controlling function 110d, the processing circuit 110 is configured to exercise control so that display-purpose ultrasound image data stored in the memory 132 is displayed on the display device 135.

Further, by employing the generating function (not illustrated), the processing circuit 110 is configured to generate ultrasound image data from the data generated by the B-mode processing function and the Doppler processing function. By employing the generating function, the processing circuit 110 is configured to generate two-dimensional B-mode image data in which intensities of the reflected waves are expressed as brightness levels, from two-dimensional B-mode data generated by the B-mode processing function. Further, by employing the generating function, the processing circuit 110 is configured to generate two-dimensional Doppler image data indicating the moving member information, from two-dimensional Doppler data generated by the Doppler processing function. The two-dimensional Doppler image data is velocity image data, dispersion image data, power image data, or image data combining any of these types of image data.

Further, by employing the generating function, the processing circuit 110 is configured to convert (by performing a scan convert process) a scanning line signal sequence from an ultrasound scan into a scanning line signal sequence in a video format used by, for example, television and to generate the display-purpose ultrasound image data. Further, as various types of image processing processes besides the scan convert process, the processing circuit 110 is configured, by employing the generating function, to perform an image processing process (a smoothing process) to re-generate an average brightness value image and/or an image processing process (an edge enhancement process) that uses a differential filter inside an image, for example, by using a plurality of image frames resulting from the scan convert process. Also, by employing the generating function, the processing circuit 110 is configured to perform various types of rendering processes on volume data to generate two-dimensional image data used for displaying the volume data on the display device 135.

The memory 132 is also capable of storing therein data generated by the B-mode processing function and the Doppler processing function. The operator is able to invoke the B-mode data and the Doppler data stored in the memory 132 after a diagnosis process, for example. The invoked data serves as display-purpose ultrasound image data after being routed through the processing circuit 110. Further, the memory 132 is also capable of storing therein the reception signal (the reflected-wave data) output by the receiver circuit 311.

In addition, the memory 132 is configured to store therein, as necessary, a control program used for performing the ultrasound transmission and reception, image processing processes, and displaying processes, as well as diagnosis information (e.g., patient IDs, medical doctors' observations) and various types of data such as diagnosis protocols and various types of body marks.

Next, a configuration of a neural network according to the embodiment will be explained, with reference to FIGS. 4 to 6.

Figure 4:
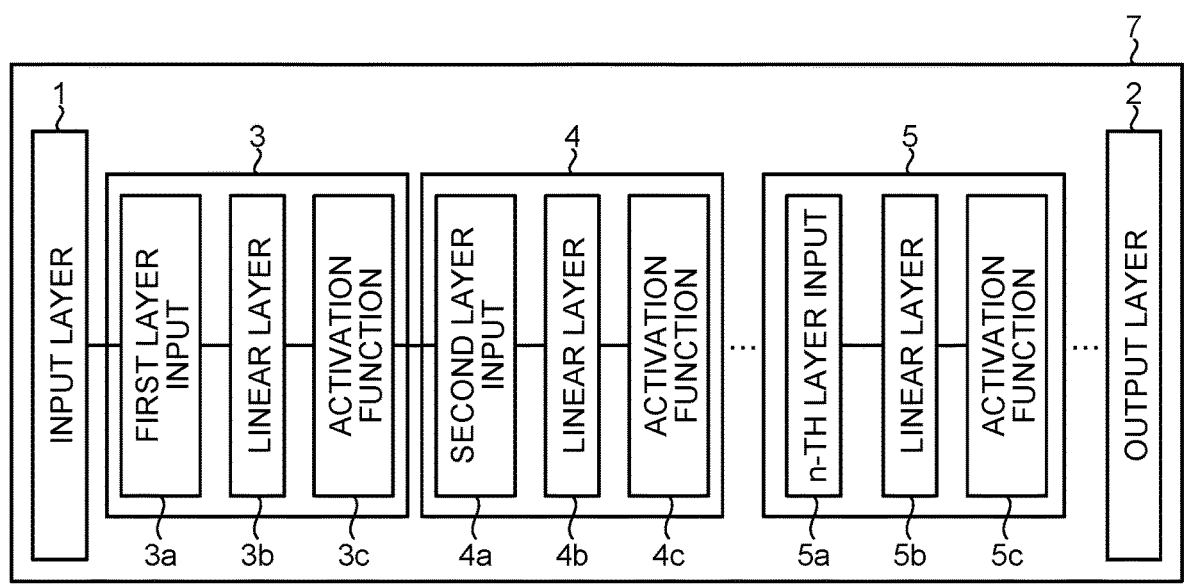
FIG. 4 is a diagram illustrating an example of a neural network according to the embodiment.

FIG. 4 illustrates an example of mutual connections among layers of a neural network 7 used for machine learning by the processing circuit 110 including the learning function 110b. The neural network 7 is structured with an input layer 1, an output layer 2, and intermediate layers 3, 4, 5, and so on provided between the input layer 1 and the output layer 2. Each of the intermediate layers is structured with a layer related to each input (hereinafter, an input layer of the respective layer), a linear layer, and a layer related to a process using an activation function (hereinafter, "activation layer"). For example, the intermediate layer 3 is structured with an input layer 3a, a linear layer 3b, and an activation layer 3c. The intermediate layer 4 is structured with an input layer 4a, a linear layer 4b, and an activation layer 4c. The intermediate layer 5 is structured with an input layer 5a, a linear layer 5b, and an activation layer 5c. Further, each of the layers is structured with a plurality of nodes (neurons).

In this situation, the data processing device 100 according to the embodiment is configured to apply a linear layer having a complex number coefficient and a non-linear activation (an activation function) to medical data having complex values. In other words, by employing the learning function 110b, the processing circuit 110 is configured to generate a trained model by training the neural network 7 that applies the linear layer having the complex number coefficient and the non-linear activation (the activation function) to the medical data having the complex values. The processing circuit 110 is configured to store the generated trained model into the memory 132, for example, as necessary.

In this situation, the data input to the input layer 1 is, typically, a medical image or medical image data obtained from a medical image diagnosis apparatus. When the medical image diagnosis apparatus is the magnetic resonance imaging apparatus 200, the data input to the input layer 1 is a magnetic resonance image, for instance. As another example, when the medical image diagnosis apparatus is the ultrasound diagnosis apparatus 300, for instance, the data input to the input layer 1 is an ultrasound image, for example.

Further, the input data input to the input layer 1 may be a medical image or may be any of various types of image data, projection data, intermediate data, and raw data before a medical image is generated. For example, when the medical image diagnosis apparatus is a PET apparatus, the input data input to the input layer 10 may be a PET image or may be any of various types of data before a PET image is reconstructed, such as time-series data of coincidence information, for example.

Further, the data output from the output layer 2 is, for example, a medical image or medical image data. Alternatively, the output data may be any of various types of projection data, intermediate data, and raw data before a medical image is generated, similarly to the data input to the input layer 1. When the purpose of the neural network 7 is a denoising process, the data output from the output layer 2 represents an image that has higher Quality than the input image, as a result of noise removal, for example.

For example, when the neural network 7 according to the embodiment is a Convolutional Neural Network (CNN), the data input to the input layer 1 is data expressed with a two-dimensional array of which the size is 32×32, for example, while the data output from the output layer 2 is data expressed with a two-dimensional array of which the is 32×32, for example. The size of the data input to the input layer 1 may be the same as or different from the size of the data output from the output layer 2. Similarly, the number of nodes in each of the intermediate layers may be the same as or different from the number of nodes in the preceding layer and/or the subsequent layer.

Next, a process of generating the trained model (i.e., a learning step) according to the present embodiment will be explained. By employing the learning function 110b, the processing circuit 110 is configured to generate the trained model by performing a machine learning process on the neural network 7, for example. In this situation, performing the machine learning process denotes, for example, determining a weight applied to the neural network 7 including the input layer 1, the intermediate layers 3, 4, 5, and the output layer 2. More specifically, performing the machine learning process denotes determining a set of coefficients characterizing the coupling between the input layer 1 and the intermediate layer 3, a set of coefficients characterizing the coupling between the intermediate layer 3 and the intermediate layer 4, . . . , and a set of coefficients characterizing the coupling between the intermediate layer 5 and the output layer 2. By employing the learning function 110b, the processing circuit 110 is configured to determine these sets of coefficients while using a backpropagation method, for example.

By employing the learning function 110b, the processing circuit 110 is configured to perform the machine learning process on the basis of training data realized by supervised data structured with data input to the input layer 1 and data output by the output layer 2 so as to determine the weights among the layers and to generate the trained model in which the applied weights have been determined.

In deep learning, it is possible to use an auto encoder. Accordingly, in that situation, the data required by the machine learning process does not necessarily have to be supervised data.

Next, a process performed at the time of applying the trained model according to the embodiment will be explained. To begin with, by employing the applying function 110e, the processing circuit 110 is configured to input an input medical image represented by a clinical image, for example, to the trained model. For example, by employing the applying function 110e, the processing circuit 110 is configured to input the input medical image represented by the clinical image to the input layer 1 of the neural network 7 serving as the trained model. Subsequently, by employing the applying function 110e, the processing circuit 110 is configured to obtain, as an output medical image, data output from the output layer 2 of the neural network 7 serving as the trained model. The output medical image is, for example, a medical image on which a predetermined process (e.g., noise removal) has been performed. In this manner, by employing the applying function 110e, the processing circuit 150 has generated the output medical image on which the predetermined process such as the noise removal has been performed. As necessary, by employing the controlling function 110d, the processing circuit 150 may cause the display device 135 to display the obtained output medical ThTlage.

Figure 5:
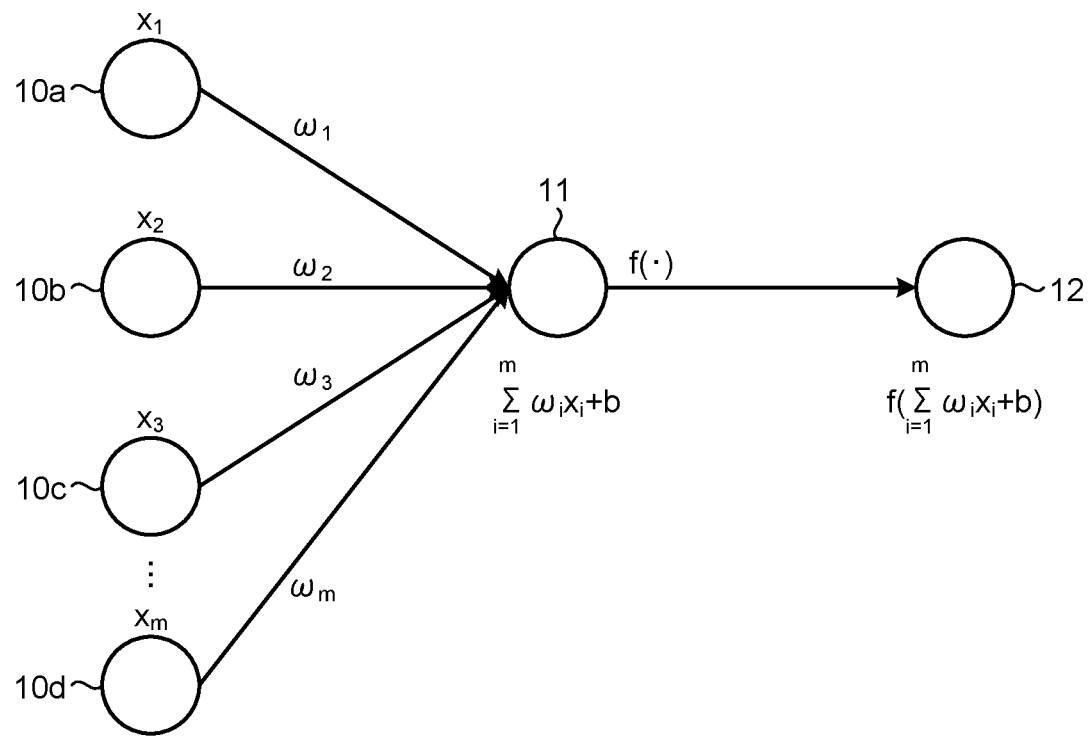
FIG. 5 is a chart for explaining a neural network according to the embodiment.

Returning to the description of the activation function and the activation layer, the following will describe the activation function in the neural network 7 with reference to FIG. 5. FIG. 5 illustrates nodes 10a, 10b, 10c, and 10d representing a part of the nodes cut out from the input layer of one of the layers. In contrast, a node 11 is one of the nodes in a linear layer, whereas a node 12 is one of the nodes in an activation layer, which is a layer related to the process (an activation) using the activation function. Although a complex-number neural network is used in the embodiment, an example with a neural network using real numbers will be explained at first.

In this situation, let us discuss an example in which output values of the nodes 10a, 10b, 10c, and 10d are real numbers $x_1$, $x_2$, $x_3$, and $x_m$, respectively, in which the total number of nodes present is m. In this situation, it is possible to express an output result to the node 11 in the linear layer as $\Sigma_{i=1}^{m}(\omega_i x_i + b)$, where $\omega_i$ denotes a weight coefficient between an input layer and the node 11; m denotes the number of nodes to which the node 11 is connected; and b denotes a predetermined constant. Further, when "y" denotes an output result to be output to the node 12 serving as the activation layer, it is possible to express "y" as indicated in Expression. (1) below, by using an activation function f.

$$y = f\left(\sum_{i=1}^{m} \omega_i x_i + b\right) \quad (1)$$

In expression (I), the activation function f is usually a non-linear function. For example, a sigmoid function, a tank function, a Rectified. Linear Unit. (ReLU), or the like may be selected as the activation function f.

Figure 6:
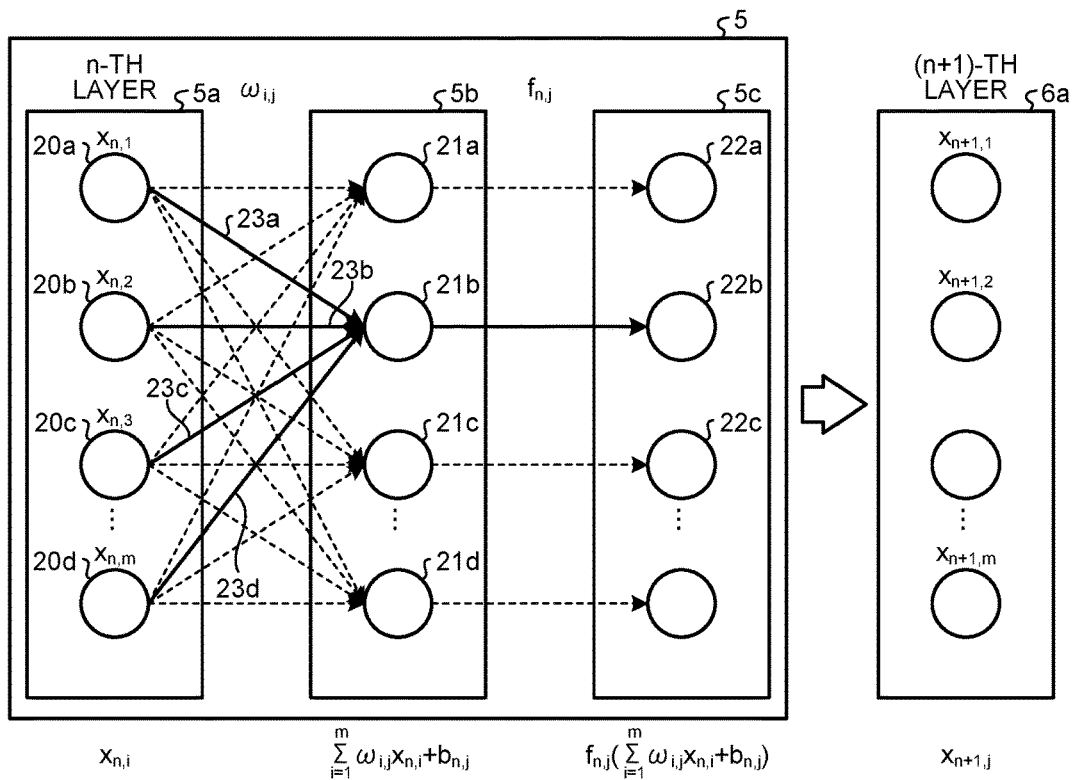
FIG. 6 is a chart for explaining an example of the neural network according to the embodiment.

FIG. 6 illustrates a process using the activation function. In FIG. 6, the intermediate layer 5 is an n-th layer in the neural network 7 and is structured with an input layer 5a, a linear layer 5b, and an activation layer 5c. An input layer 6a is an (n+1)-th layer in the neural network. Further, the input layer 5a includes nodes 20a, 20b, 20c, 20d, and so on. The linear layer 5b includes nodes 21a, 21b, 21c, 21d, and so on. The activation layer 5c includes nodes 22a, 22b, 22c, and so on. Further, FIG. 6 illustrates a real-number neural network in which each of the nodes has a real number value. An input result $x_{n,j}$ to the input layer 5a and an output result $x_{n+i,j}$ from the input layer 6a are each a real number value.

In this situation, an output result to the linear layer 5b is calculated by performing predetermined weighted addition with respect to each of the nodes in the input layer 5a. For example, it is possible to express an output result to a j-th node 21b in the linear layer 5b as $\Sigma_1 = 1^m \omega_{1,j} x_{n,i} + B_{n,j}$, where $\omega_{i,j}$ denotes a weight coefficient between the i-th input node and a j-th linear node, whereas $b_{n,j}$ denotes a predetermined constant known as a bias term. In this situation, $\omega_{i,j}$ is considered as a first-order coefficient in the linear calculation at the linear laver, whereas $b_{n,j}$ is considered as a zeroth-order coefficient in the linear calculation at the linear layer. After that, an output result to the activation layer 5c is calculated by causing the activation function f to act on each of the nodes in the linear layer 5b. For example, it is possible to express an output to a j-th node 22b in the activation layer 5c as $f_{n,j}(\Sigma_1 = 1^m \omega_{1,j} x_{n,i} + B_{n,j})$ by using an activation function $f_{n,j}$. In this situation, possible processes in the linear layer are not limited to the processes described above. It is acceptable to use any of various types of publicly-known methods. For example, it is also acceptable to use a convolutional layer as the linear layer.

Subsequently, on the basis of the value output by the nodes in the activation layer 5c, the values of the nodes in the input layer 6a in the n-th layer are determined. In one example, the values of the nodes in the activation layer Sc may be input, without being changed, to the nodes in the input layer 6a, In another example, the nodes in the input layer 6a may be determined by causing further non-linear function to act on the activation layer 5c.

Figure 7:
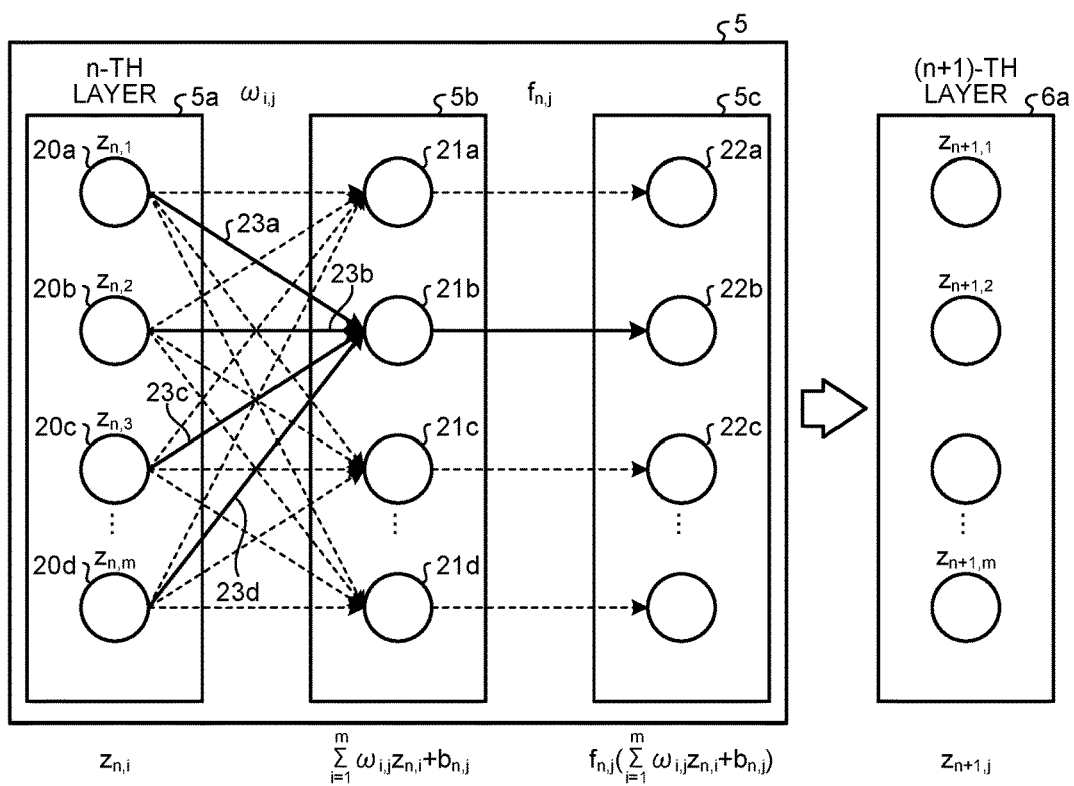
FIG. 7 is a chart for explaining another example of the neural network according to the embodiment.

Next, a complex-number neural network will be explained. FIG. 7 illustrates a configuration in the situation where the neural network 7 used in the machine learning process by the processing circuit 110 including the learning function 110b is a complex-number neural network. The complex-number neural network illustrated in FIG. 7 has a configuration similar to that of the real-number neural network illustrated in FIG. 6, but the values $z_{n,j}$ of the nodes are each a complex number. Further, the activation function $f_{n,j}$ is also a function being defined in a complex number region and having complex number values. When an input value input to a j-th node of an (n+1)-th input layer is expressed as $z_{n,j}$, Expression (2) presented below holds true, for example. In this manner, by using the complex number nodes as the nodes in the neural network 7, for example, it is possible to generate the neural network 7 having complex number values.

$$z_{n+1,j} = f_{n,j}\left(\sum_{i=1}^{m} \omega_{i,j} z_{n,i} + b_{n,j}\right) \quad (2)$$

Next a background of the embodiment will be explained.

In machine learning employing neural networks, real-number neural networks are used as a standard. However, in medical data processing devices for magnetic resonance imaging apparatuses, ultrasound diagnosis apparatuses, and the like, because signal processing using complex numbers is often used, it is expected that using a complex-number neural network will make a wide range of application possible.

In this regard, examples of a method for handling complex numbers in a neural network include a method by which, for instance, each complex number is divided into a real part and an imaginary part, so as to handle complex numbers in the neural network by considering the real part and the imaginary part as nodes in a standard real-number neural network. In a possible method, for example, complex numbers are handled in a neural network, by causing a ReLU to act on the real part and the imaginary part of the complex numbers as an activation function.

In yet another example, each complex number is expressed by using an absolute value (or an absolute value with a sign) and a phase, so as Co handle complex numbers in a neural network by considering the absolute value and the phase as nodes in a standard real-number neural network.

In relation to the above, in medical images such as magnetic resonance images and ultrasound images, for example, it is often the case that phase information of the images (e.g., the slope of the phase) is important. In contrast, there are relatively fewer situations where the absolute value of the phase has a dominant significance. For example, in magnetic resonance imaging apparatuses, although a small difference in a center frequency can appear as a phase modulation of an entire image, the importance of the absolute values themselves of those phases is relatively, low in many situations. For this reason, when a complex-number neural network is applied to medical images for removing noise or extracting a region, for example, it is desirable to configure a neural network of which output results do not fluctuate significantly in response to the phase modulation of entire images, while phase information of input images is not ignored.

In one example, as for a denoising process in which a complex-convolution is used while a ReLU is applied to the real part and to the imaginary part, when the distribution in a teacher image used by a complex-number neural network is biased toward the real part, for example, coefficients to be learned may place importance on the real part of an input image, while omitting the imaginary part thereof.

In the situation where an image biased toward the imaginary part is applied as an input image to the trained model generated in this manner, it is anticipated that the trained model may not exert expected capabilities.

Figure 8:
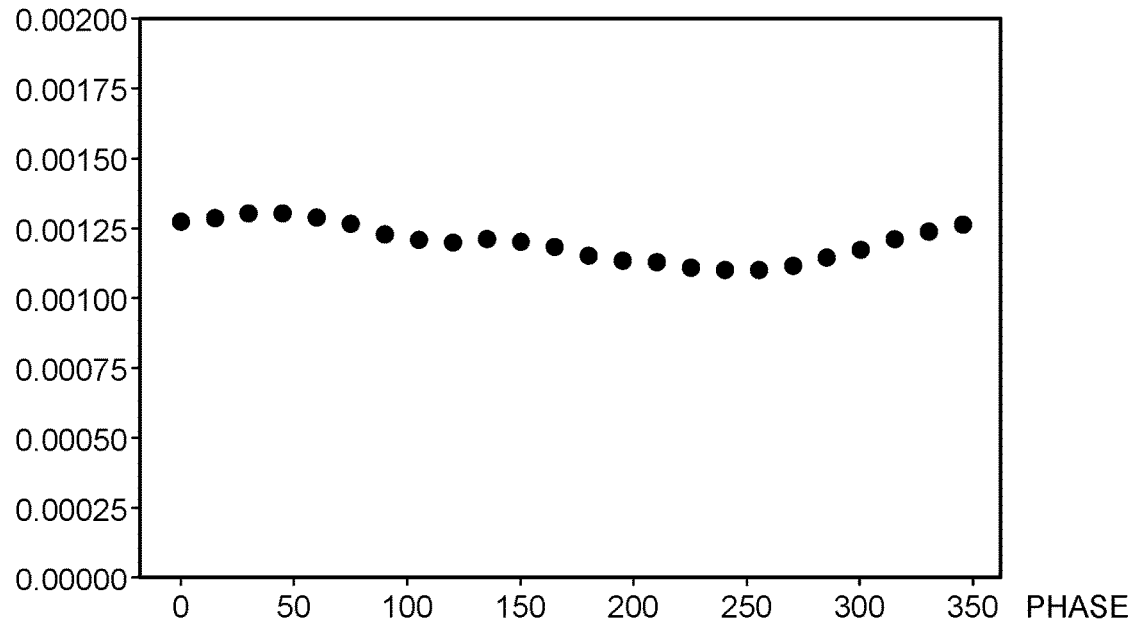
FIG. 8 is a chart for explaining a background of the embodiment.

The situation described above is illustrated in FIG. for example. FIG. 8 is a graph illustrating a denoising capability of a trained model when the trained model is generated so as to perform a denoising process by using the complex-number neural network 7 in which a complex-convolution and CreLUs (i.e. applying ReLU to the real part and the imaginary part of a complex neural network, respectively) are stacked in six layers. In FIG. 8, at the time of generating the trained model, training is performed by preparing 38 teacher images. When a single test image is applied to the generated trained model while modulating only the phase, Mean Square Error (MSE) values of an output image after applying the trained model are plotted as a function of the phase. As understood from FIG. 8, with respect to the phase of the input image, the quality of the output image after applying the trained model is not constant, with respect to the phase of the input image.

As a method for solving the problem where the image quality of the output image after applying the trained model is not constant with respect to the phase of the input image, it is possible to use a method (called phase argumentation) to achieve statistical stabilization where a phase modulation is randomly applied to teacher images. However, in some situations, learning efficiency of the phase argumentation method is not very high.

In view of the background described above, a medical data processing device according to the embodiment is configured to construct a neural network by combining an activation function (an activation) having no dependency on angles on a complex plane (angle-independent), with a linear layer that uses complex numbers as coefficients.

In other words, the data processing device 100 according to the embodiment includes the processing circuit 110 configured to apply the linear layer having the complex number coefficients and the non-linear activation not dependent on the argument of complex numbers (i.e., gain does not change depending on the argument of complex numbers), to medical data having complex values.

Figure 9:
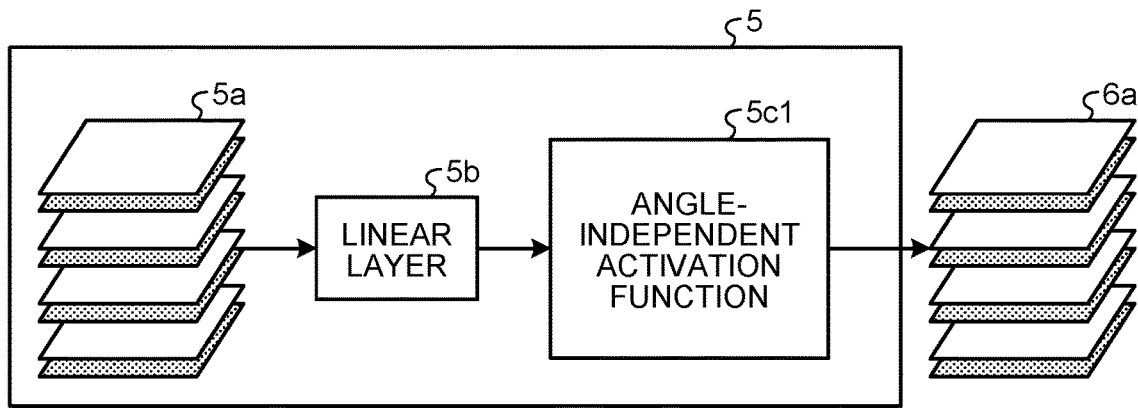
FIG. 9 is a diagram for explaining yet another example of the neural network according to the embodiment.

FIG. 9 illustrates the situation described above. FIG. 9 depicts a configuration of one of the intermediate layers (the intermediate layer 5) cut out from FIG. 4, within the neural network 7 trained by the data processing device 100 according to the embodiment. As already explained with reference to FIG. 4, the intermediate layer 5 is structured with the input layer 5a, the linear layer 5b, and the activation layer 5c (the activation function). However, in the data processing device 100 according to the embodiment, the activation layer 5c is an angle-independent activation function 5c1, which is a non-linear activation not dependent on the argument of complex numbers.

In other words, by employing the learning function 110b, the processing circuit 110 is configured to generate the trained model by training the neural network 7 that applies, to the medical image having complex values, the linear layer 5b or the like having the complex number coefficients and the angle-independent activation function 5c1, which is a non-linear activation not dependent on the argument of complex numbers.

In this situation, examples of the angle-independent activation function 5c1 include function systems presented in Expressions (3) to (8) below, for instance. In Expressions (3) to (8), z denotes a complex number.

$$f(z) = \frac{\mathrm{ReLU}(|z| - \lambda)}{|z|} z \quad (3)$$

$$f(z) = \frac{\mathrm{ReLU}(zz^* - \lambda)}{zz^*} z \quad (4)$$

$$f(z) = \frac{\beta[|z|/\beta - \tanh(|z|/\beta)]}{|z|} z \quad (5)$$

$$f(z) = |z|^p z \quad (6)$$

In Expression (3), λ denotes a certain real number, while ReLU (x) (a Rectified Linear Unit) is max (0, x) where x is a real number. The right-hand side of Expression (3) is equal to 0 when the absolute value of the complex number z is smaller than λ. The right-hand side of Expression (3) is a complex number of which the absolute value is equal to "|z|−λ" and of which the argument is equal to z when the absolute value of the complex number z is larger than λ. Accordingly, Expression (3) presents a non-linear activation not dependent on the argument of complex numbers. It is also possible to consider Expression. (3) as an extension of a soft-shrink function defined for real numbers to complex numbers.

Further, in Expression (4), z* denotes the complex conjugate of z. Although Expression. (4) presents a function similar to that in Expression (3), while Expression. (3) presents the function structured on the basis of the first power of the absolute value of the complex number z, Expression (4) presents the function structured on the basis of the second power of the absolute value of the complex number z. Expression (4) has an advantageous characteristic where it is possible to quickly evaluate the value on the right-hand side at the time of calculating numerical values.

Further, in Expression (5), β denotes a certain real number. On the right-hand side of Expression (5) also, the absolute value is expressed with a non-linear function of the input signal, while the angle is equal to the angle of the input signal. Accordingly, Expression (5) presents a non-linear activation not dependent on the argument of complex numbers. It is also possible to consider Expression (5) as an extension of a tan h-shrink function defined for real numbers to complex numbers.

Further, in Expression (6), p denotes a certain real number. On the right-hand side of Expression (6) also, there is no possibility that the contribution from a specific direction at the argument of complex numbers is selectively large. Accordingly, Expression (6) presents a non-linear activation not dependent on the argument of complex numbers.

Further, as variations of Expression (3), for example, the function systems presented in Expression (7) and Expression (8) below may be used:

$$f(z) = \mathrm{ReLU}(|z| - \lambda) z \quad (7)$$

$$f(z) = \mathrm{ReLU}(-|z| + \lambda) z \quad (8)$$

The non-linear activations that are not dependent on the argument of complex numbers presented in Expressions (3) to (8) above are merely examples. It is possible to use other various function systems. Other examples of the non-linear activation not dependent on the argument of complex numbers include a function expressed as "f (z)=g(|z|)z" while using a real variable function g (x), i.e., a function including a real variable function related to the absolute value of a complex number being input such as, for example, a function in which the real variable function related to the absolute value of the complex number being input is multiplied by the complex number being input. Examples of the real variable function structuring such a non-linear activation include, as mentioned above, a soft-shrink function, a tan h-shrink function, a power function, and a function including a ReLU function.

Each of these non-linear activations is, typically, a function of which the output value is zero when the input value is zero. The reason is that, if the output value is not zero when the input value is zero, convergence of the calculation results from the neural network including such a non-linear activation is not satisfactory.

Figure 10:
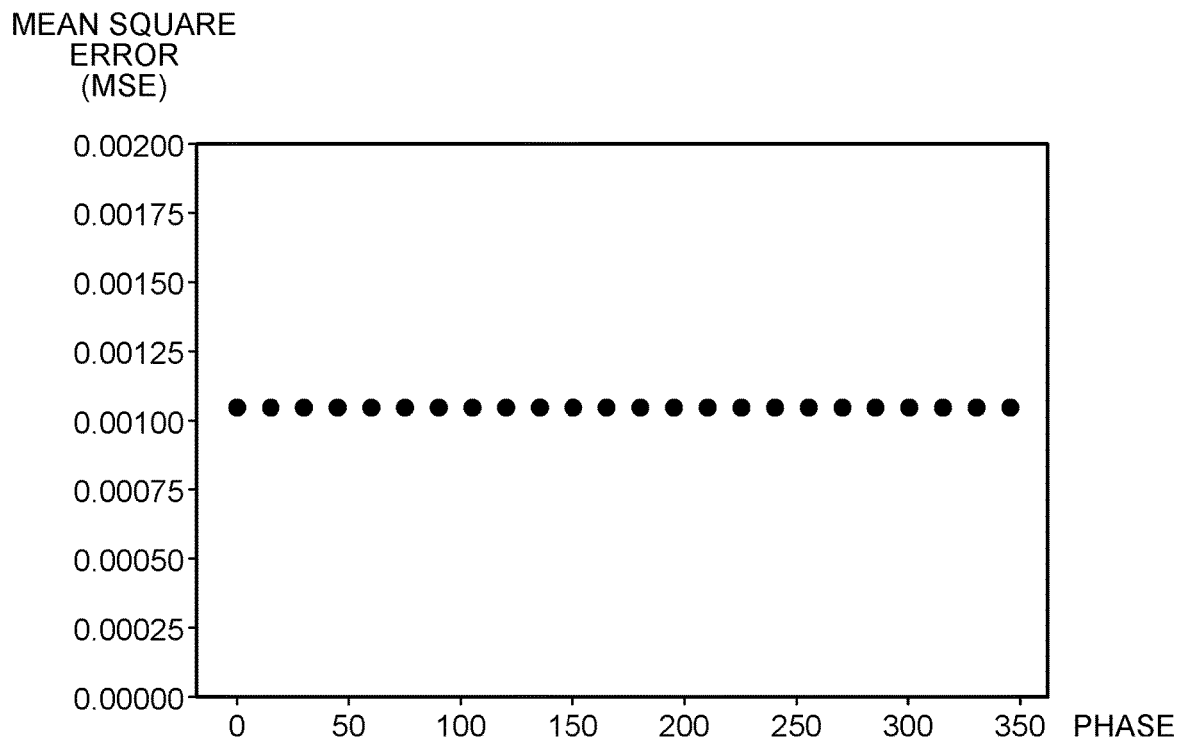
FIG. 10 is a chart for explaining an example of a process performed by the neural network according to the embodiment.

FIG. 10 illustrates a situation in which the activation according to the embodiment is applied. FIG. 10 presents a graph indicating denoising capabilities of the trained model, when then trained model is generated so as to perform the denoising process by using the complex-number neural network 7 in which a complex-convolution of which the bias term is fixed to 0 and the complex-number tan h-shrink function presented in Expression (5) are stacked in six layers. In other words, the processing circuit 110 is configured to further apply the complex convolution process in which the bias term is fixed to 0. That is to say, the linear calculation of the complex number coefficients to be applied by the processing circuit 110 to the medical data having complex number values includes the process in which the bias term is fixed to 0 and also includes the complex convolution. However, the complex convolution process is not limited to the example in which the bias term is fixed to 0. In FIG. 10, when a single test image is applied to the generated trained model while modulating only the phase, Mean Square Error (MSE) values of an output image after applying the trained model are plotted as a function of the phase. As understood from FIG. 10, even while the phase of the input image varied, it was possible to obtain an output image having stable image quality.

Figure 11:
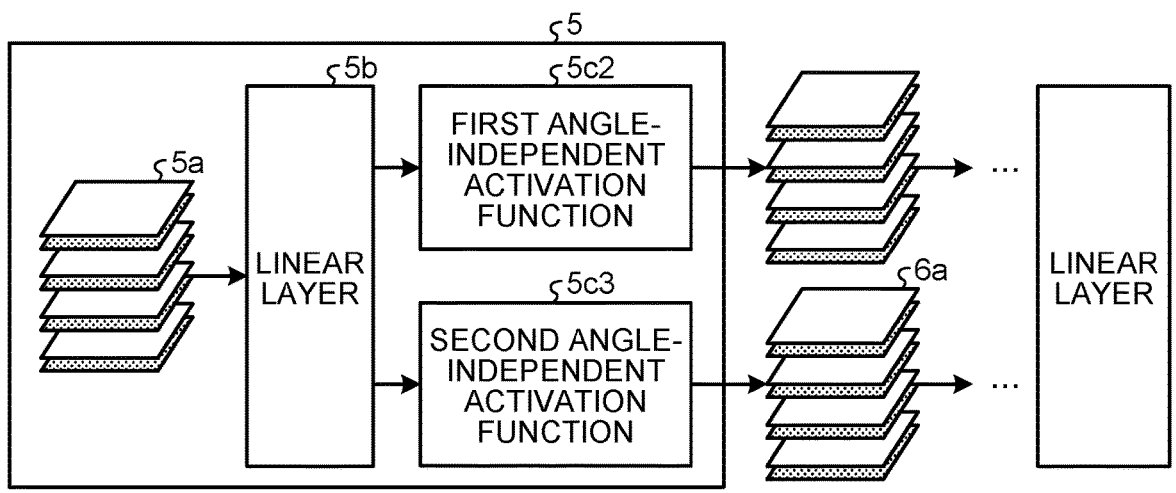
FIG. 11 is a diagram for explaining yet another example of the neural network according to the embodiment.

Possible embodiments are not limited to the example described above. By employing the learning function 110b, the processing circuit 110 may generate a trained model by using two or more non-linear activations that are not dependent on the argument of complex numbers. This situation is illustrated in FIG. 11. In FIG. 11, the intermediate layer 5 includes the input layer 5a, the linear layer 5b, a first angle-independent activation function 5c2 and a second angle-independent activation function 5c3. In other words, the processing circuit 110 is configured to generate an output result to the next layer by applying the first angle-independent activation function 5c2 to a part of the nodes in the linear layer 5b and to generate another output result to the next layer by applying the second angle-independent activation function 5o3 to another part of the nodes in the linear layer Sb that is different from the abovementioned part of the nodes.

In a first example using two or more non-linear activations that are not dependent on the argument of complex numbers, it is possible to use non-linear activations that are not dependent on the argument of complex numbers and are based on mutually-different function systems. For example, by employing the learning function 110b, the processing circuit 110 may be configured to perform a learning process by applying, to medical data, non-linear activations based on a plurality of mutually-different function systems such as the complex soft-shrink function presented in Expression (3) and the complex tanh-shrink function presented in Expression (5), for example. In the example in FIG. 10, by employing the learning function 110b, the processing circuit 110 performs the learning process by applying a complex soft-shrink function to a part of the nodes in the linear layer 5b as the first angle-independent activation function 5c2 and applying a complex tan h-shrink function to another part of the nodes in the linear layer 5b as the second angle-independent activation function 5c3.

In a second example of using two or more non-linear activation functions that are not dependent on the argument of complex numbers, it is possible to use non-linear activations using a plurality of functions that are based on mutually the same function system but have mutually-different function parameter values such as λ in Expressions (3) and (4), β in Expression (5), and p in Expression (6), for example. In other words, by employing the learning function 110b, the processing circuit 110 may perform the learning process by applying, to medical data, the non-linear activations using a plurality of functions that are based on mutually the same function system but have mutually-different function parameters, for instance in one example, by employing the learning function 110b, the processing circuit 110 performs the learning process, by applying a complex soft-shrink function expressed with. Expression. (3) in which "λ=λ$_1$" to a part of the nodes in the linear layer 5b as the first angle-independent activation function 5c2 and applying a complex soft-shrink function expressed with Expression ( ) in which "λ=λ$_2$" to another part of the nodes in the linear layer 5b as the second angle-independent activation function 5c3.

In yet another example, it is also acceptable to apply an identity function to a part of the nodes as an activation function.

In these situations, the function parameters may be fixed or may be variable parameters that change in the process of the machine learning. Further, it is also acceptable when the single neural network 7 includes both one or more fixed function parameters and one or more variable function parameters made as parameters that change.

Figure 12:
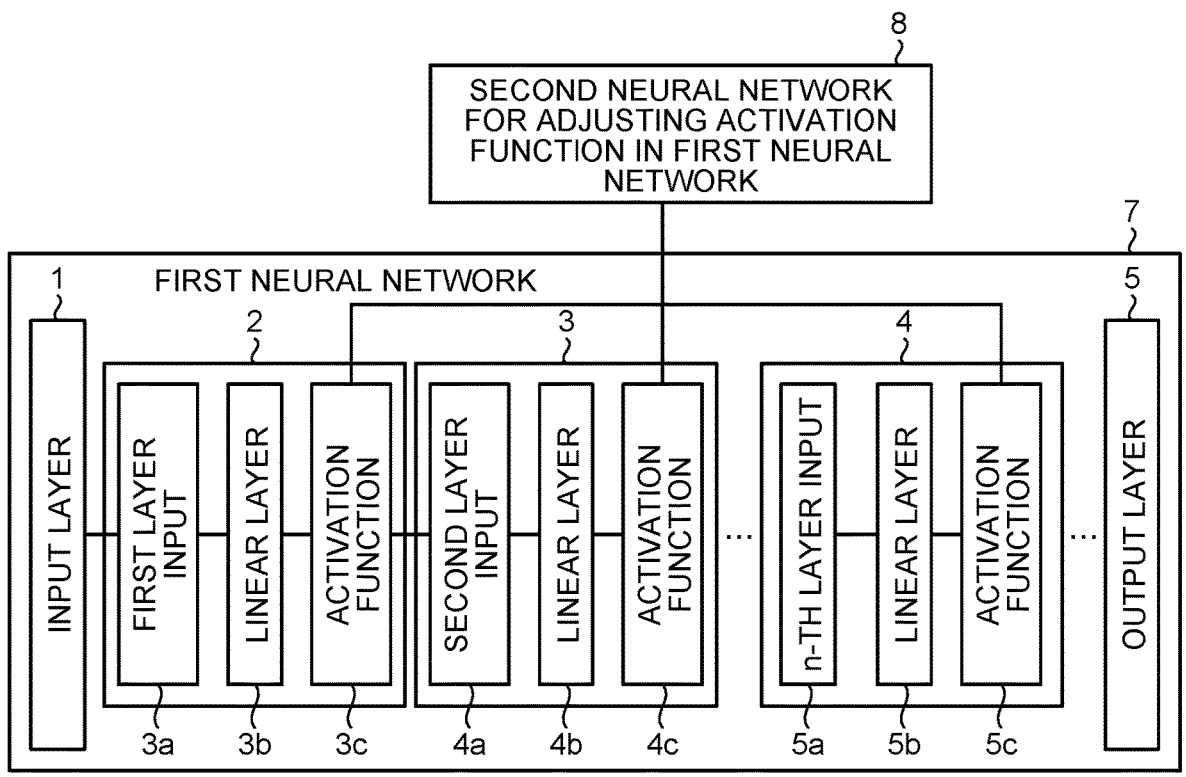
FIG. 12 is a diagram for explaining yet another example of the neural network according to the embodiment.

Further, the function parameters described above may be trainable through machine training. FIG. 12 illustrates an example of this configuration.

As illustrated in FIG. 12, the processing circuit 110 includes: a first neural network 7 that is a neural network configured to output an output image/output data in response to an input image/input data; and a second neural network 8 used for adjusting the activation function in the first neural network 7. The second neural network 8 is connected to the activation layers 3c, 4c, and 5c in the first neural network 7 and is configured to control parameters of the activation function in the activation layers. In other words, the processing circuit 110 includes: the neural network 7 configured to apply the non-linear activations that are not dependent on the argument of complex numbers to medical data and a calculating unit (not illustrated in FIG. 1) configured to optimize the function parameters related to the non-linear activations that are not dependent on the argument of complex numbers. The second neural network 8 is an example of the abovementioned calculating unit.

As an example, a situation will be explained in which the complex soft-shrink function expressed with Expression (3) is used as the activation function f. The value of the parameter λ of the complex soft-shrink function serving as the activation function for the activation layers 3c, 4c, and 5c in the first neural network 7 is determined as "λ=λ$_i$,", where i denotes an i-th layer. In this situation, λ$_1$ has a constant value for each of the layers. The value of λ, is optimized by the calculating unit through a learning process.

In an example of the parameter optimization method described above, the processing circuit 110 may alternately repeat a first learning process performed by the learning function 110b to learn the weight coefficients used in the first neural network 7 and a second learning process performed by the calculating unit to learn the parameter values of the activation function in the first neural network 7.

Further, in yet another example, the processing circuit 110 may execute the second learning process performed by the calculating unit to learn the parameter values of the activation function in the first neural network 7 and subsequently execute, while using the learned parameter values, the first learning process performed by the learning function 110b to learn the weight coefficients used in the first neural network 7.

Furthermore, the processing circuit 110 may execute the first learning process and the second learning process at the same time.

Further, the configuration of the calculating unit does not necessarily have to be realized with a neural network. For example, it is also acceptable to optimize the parameter values of the activation function in the first neural network 7 by using a linear regression or the like.

Further, in the above embodiment, the example was explained in which the parameters are different for each of the layers and are used in common for each of the nodes. However, possible embodiments are not limited to this example. It is also acceptable to use parameters that are in common with respect to each of the layers. Alternatively, it is also acceptable to use parameters that are different for each of the layers and each of the nodes.

In the embodiment described above, the example was explained in which only the angle-independent activation functions are used as the activation functions of the neural network 7; however, possible embodiments are not limited to this example. It is also acceptable to additionally use, as an activation function in the neural network 7, an activation function sensitive to the argument of complex numbers called Complex Sensitive Activation Function (CPSAF). In other words, by employing the learning function 110b, the processing circuit 110 may further apply an activation of which the gain (an output) changes depending on the argument of complex numbers to the neural network 7. In this situation, the gain denotes the magnitude of an output with respect to an input, for example.

For example, when it is desired to eliminate a specific component of the argument of complex numbers through a phase denoising process or the like, it is possible to efficiently perform the denoising process by using, for example, an activation function of which the gain changes depending on the argument of complex numbers, together with a non-linear activation not dependent on the argument of complex numbers, i.e., an activation function of which the gain does not change depending on the argument of complex numbers.

Figure 13:
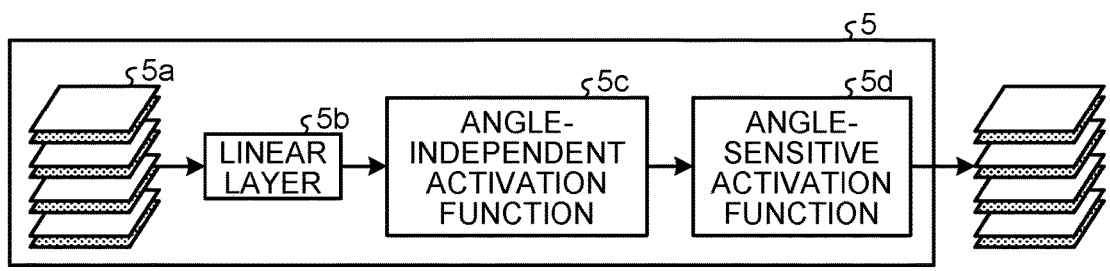
FIG. 13 is a diagram for explaining yet another example of the neural network according to the embodiment.
Figure 14:
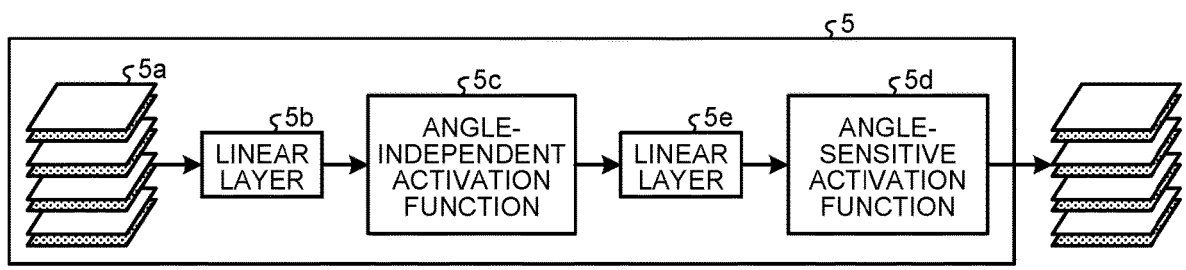
FIG. 14 is a diagram for explaining yet another example of the neural network according to the embodiment.

More specifically, for example, as illustrated in FIGS. 13 and 14, by employing the learning function 110b, the processing circuit 110 sequentially applies the non-linear activation not dependent on the argument of complex numbers and the activation of which the gain changes depending on the argument of complex numbers.

For example, as illustrated in FIG. 13, the intermediate layer 5 includes the input layer 5a, the linear layer Sb, the activation layer 5c using an angle-independent activation function, and an activation layer 5d using an activation function sensitive to the argument of complex numbers. By employing the learning function 110b, the processing circuit 110 is configured to output an output result from the input layer 5a to the linear layer 5b, to output an output result from the linear layer 5b to the activation layer Sc using the angle-independent activation function, to output an output result from the activation layer 5c using the angle-independent activation function to the activation layer 5d using the activation function sensitive to the argument of complex numbers, and to output an output result from the activation layer 5d using the activation function sensitive to the argument of complex numbers to the input layer of the next layer.

In another example, as illustrated in FIG. 14, for example, the intermediate layer 5 includes the input layer 5a, the linear layer 5b, the activation layer 5c using the angle-independent activation function, a linear layer 5e, and the activation layer 5d using the activation function sensitive to the argument of complex numbers. By employing the learning function 110h, the processing circuit 110 is configured to output an output result from the input layer 5a to the linear layer 5h, to output an output result from the linear layer Sb to the activation layer 5c using the angle-independent activation function, to output an output result from the activation layer Sc using the angle-independent activation function to the linear layer 5e, to output an output result from the linear layer 5e to the activation layer 5d using the activation function sensitive to the argument of complex numbers, and to output an output result from the activation layer 5d using the activation function sensitive to the argument of complex numbers to the input layer of the next layer.

In FIGS. 13 and 14, the order in which the activation layer 5c using the angle-independent activation function and the activation layer 5d using the activation function sensitive to the argument of complex numbers are executed is not limited to the order of execution illustrated in the drawings. For example, it is also acceptable to execute the activation layer 5d using the activation function sensitive to the argument of complex numbers and to subsequently execute the activation layer 5c using the angle-independent activation function.

Figure 15:
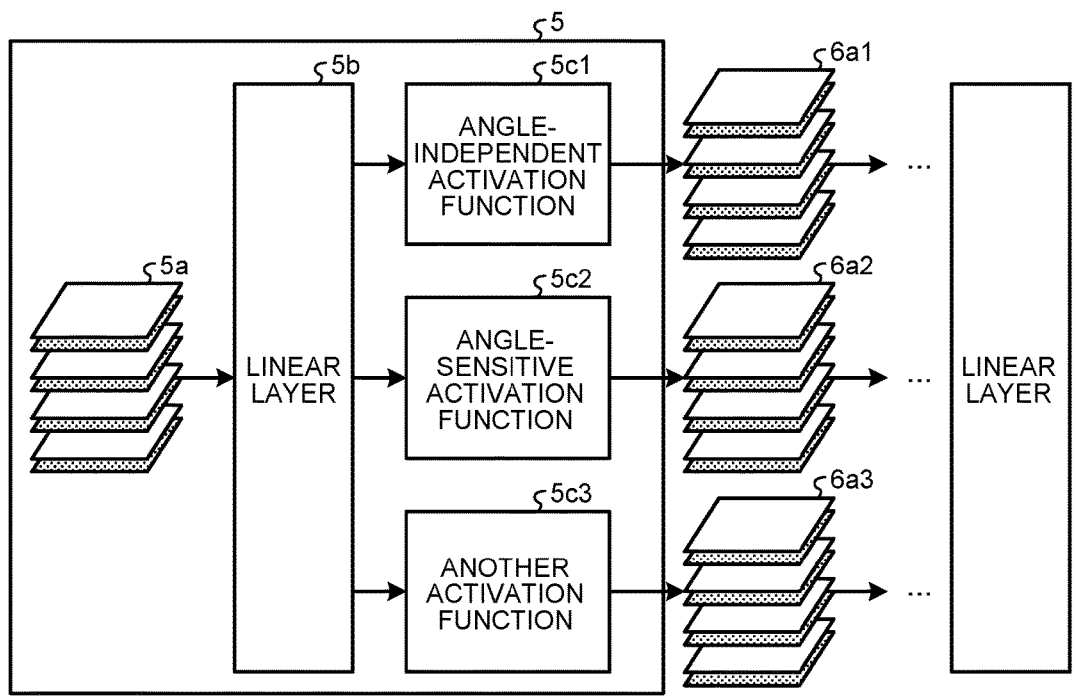
FIG. 15 is a diagram for explaining yet another example of the neural network according to the embodiment.

Further, in yet another example, as illustrated in FIG. 15, the processing circuit 110 may selectively apply a non-linear activation that is not dependent on the argument of complex numbers and an activation of which the gain changes depending on the argument of complex numbers. In the example in FIG. 15, the intermediate layer 5 includes the input layer 5a, the linear layer 5b, the activation layer 5c1 using the angle-independent activation function, the activation layer 5c2 using the activation function sensitive to the argument of complex numbers, and the activation layer 5c3 using another activation function. In this situation, by employing the learning function 110b, the processing circuit 110 is configured to output an output result from the input layer 5a to the linear layer 5b, to output some of the output result from the linear layer 5b corresponding to a part of the nodes to the activation layer 5c1 using the angle-independent activation function, and to output an output result from the activation layer 5c1 using the angle-independent activation function to corresponding nodes 6a1 within the input layer of the next layer. Also, the processing circuit 110 is configured to output some of the output result from the linear layer 5b corresponding to another part of the nodes to the activation layer 5c2 using the activation function sensitive to the argument of complex numbers and to output an output result from the activation layer 5c2 using the activation function sensitive to the argument of complex numbers to corresponding nodes 6a2 within the input layer of the next layer. In addition, the processing circuit 110 is configured to output some of the output result from the linear layer 5b corresponding to yet another part of the nodes to the activation layer 5c3 using said another activation function and to output an output result from the activation layer 5c3 using said another activation function to corresponding nodes 6a2 within the input layer of the next layer.

As explained above, in the example of FIG. 15, the processing circuit 110 is configured to vary the applied nonlinear activation among the nodes in the linear layer 5b. With this arrangement, it is possible to efficiently perform the machine learning process reflecting characteristics of the nodes in the linear layer 5b and to thus improve the image quality.

Returning to the description of the activation function sensitive to the argument of complex numbers, specific examples of the activation function sensitive to the argument of complex numbers (Complex Sensitive Activation Function [CPSAF]) include a function f1 expressed with. Expression (9) presented below, for example.

$$f1_{\alpha,\beta}(z)=W_\beta(\text{phase}(z)-a)z \tag{9}$$

In Expression (9), z denotes a complex number; phase (z) denotes the argument of the complex number z, while $\alpha$ and $\beta$ each denote a real number parameter. A gain control function $W_\beta(x)$ is a function defined on the basis of a real number x and, for example, is a function that extracts an angle near "x=0" by using a method characterized by the parameter $\beta$. In the following sections, an example will be explained in which, for instance, the gain control function $W_\beta(x)$ is a function which exhibits a maximum value at "x=0" and of which the value decreases as the distance from "x=0" increases. Further, because angles that are different from each other by a constant multiple of $2\pi$ can be considered to be the same, it is also acceptable to select, as the gain control function $W\beta$, a periodic function that has a periodicity of $2\pi$ and that satisfies "$W\beta(x+2n\pi)=W\beta(x)$".

The activation function f1(z) is obtained by multiplying the complex number z by the gain control function $W_\beta$phase (z)-$\alpha$). Accordingly, the activation function f1(z) is able to achieve large gain (signal value) when the argument of the complex number z is close to $\alpha$ to a certain extent, while the magnitude of the gain is controlled by the parameter $\beta$. Consequently, the activation function f1$_{\alpha\beta}$ expressed in Expression (9) is considered as a function expressed with the product of the gain control function that extracts a signal component in a predetermined angle direction and the input complex number and thus serves as an example of the activation function sensitive to the argument of complex numbers.

Another example of the activation function sensitive to the argument of complex numbers is an activation function f2(z) expressed with Expression (10) presented below.

$$f2_{\alpha\beta}(z)=f1_\alpha(z) \tag{10}$$

In expression (10), the activation function f2 (z) is a special example of Expression (9) in which the gain control function $W\beta(x)$ is expressed with Expression (11) presented below.

$$W_\beta(x)=1 \text{ if } |\text{wrap}(x)|<\beta\, 0 \text{ otherwise} \tag{11}$$

In Expression (11), the wrap function on the right-hand side can be expressed with Expression (12) presented below, where n is a natural number.

$$\text{Wrap}(x)=y\,s.t.x=2n\pi+y \text{ and } -\pi\leq y<\pi \tag{12}$$

In other words, the gain control function $W\beta(x)$ on the left-hand side of Expression (11) is a function that returns 1 when the angle x is within the range of $\beta$ while 0 is used as a reference and otherwise returns 0. In other words, the activation function f2$_{\alpha\beta}$(z) is a function that extracts a complex number region that falls in the range of the angle $\beta$ from the angle $\alpha$ direction. That is to say, the activation function f2$_{\alpha\beta}$(z) expressed with Expression (10) is considered as a function that extracts a signal component within the range from the predetermined angle $\alpha$ to the predetermined angle $\beta$ and thus serves as an example of the activation function sensitive to the argument of complex numbers.

Further, other examples of the activation function sensitive to the argument of complex numbers include activation functions f3 (z) to f5(z) expressed with Expressions (13) to (15) presented below.

$$f3_{\alpha\beta}(z)=\text{Re}(f1_{\alpha\beta}(z)\exp(-i\alpha))\exp(i\alpha) \tag{13}$$

$$f4_{\alpha\beta}(z)=f3_{\alpha\beta}(z)+I\,m(z\,\exp(+i\alpha))\exp(i\alpha) \tag{14}$$

$$f5_{\alpha\beta}(z)=A_{legacy}(\text{Re}(f1_{\alpha\beta}(z)\exp(-i\alpha)))\exp(i\alpha) \tag{15}$$

In Expression (13), the activation function f3$_{\alpha\beta}$(z) is obtained by calculating the real part after rotating the activation function f1$_{\alpha\beta}$(z) to the right by the angle $\alpha$ and subsequently rotating again by the angle $\alpha$ in the opposite direction of the direction used in the previous rotating operation. In other words, the activation function f3$_{\alpha\beta}$(z) is a function corresponding to operations including the rotating operation on the origin, the operation to calculate the real part of the complex number, and the rotating operation in the direction opposite to the direction used in the previous rotating operation.

Further, in Expression (14), the activation function f4$_{\alpha\beta}$ (z) is obtained by adding, to the activation function f3$_{\alpha\beta}$(z), a result of calculating the imaginary part after rotating the complex number z to the right by the angle $\alpha$ and subsequently rotating again by the angle $\alpha$ in the opposite direction of the direction used in the previous rotating operation.

In Expression (15), $A_{legacy}$ denotes a standard activation function that returns a real number value in response to a given real number value. Examples of $A_{legacy}$ include, for instance, a sigmoid function, a soft sign function, a soft plus function, a tanh function, a ReLU, a truncated power function, a polynomial, a radial basis function, and a wavelet. In Expression (15), the activation function f5$_{\alpha\beta}$(z) is basically a function similar to the activation function f3$_{\alpha\beta}$(z), but additionally includes the operation of calculating the real part and subsequently applying the activation function $A_{legacy}$ defined with a real number.

To summarize the above, f1$_{\alpha\beta}$ in Expression (9), f2$_{\alpha\beta}$(z) in Expression (10), f3$_{\alpha\beta}$(z) in Expression (13), f4$_{\alpha\beta}$(z) in Expression (14), and f5$_{\alpha\beta}$(z) in Expression (15) serve as specific examples of the activation function used in the activation layer 5d in FIGS. 13 and 14 and the activation layer 5c2 in FIG. 15.

According to at least one aspect of the embodiments described above, it is possible to improve the image quality.

Regarding the embodiments described above, the following notes are disclosed as certain aspects and selected characteristics of the present disclosure:

Note 1: A medical data processing device provided according to an aspect of the present disclosure includes: a processing circuit configured to apply a linear calculation of a complex number coefficient and a non-linear activation not dependent on an argument of complex numbers, to medical data having a complex value.

Note 2: The non-linear activation may be a function including a real variable function related to an absolute value of a complex number being input.

Note 3: The non-linear activation may be a function obtained by multiplying the real variable function by the complex number being input.

Note 4: The non-linear activation may be a function of which an output value is zero in response to an input value being zero.

Note 5: The real variable function included in the non-linear activation may be a function including one selected from among: a soft-shrink function, a tank-shrink function, a power function, and a ReLU function.

Note 6: The processing circuit may be configured to apply the non-linear activation based on a plurality of mutually-different function systems, to the medical data.

Note 7: The processing circuit may be configured to apply the non-linear activation to the medical data, by using a plurality of functions which are based on a mutually same function system and of which function parameters are mutually different.

Note 8: The processing circuit may include a neural network configured to apply the non-linear activation to the medical data, and the processing circuit may be configured to optimize a function parameter related to the non-linear activation.

Note 9: The processing circuit may be configured to further apply an activation of which an output. (gain) changes depending on the argument of complex numbers. The gain denotes the magnitude of the output with respect to an input.

Note 10: The processing circuit may be configured to sequentially apply the non-linear activation not dependent on the argument of complex numbers and the activation of which the output (the gain) changes depending on the argument of complex numbers.

Note 11: The processing circuit may be configured to selectively apply the non-linear activation not dependent on the argument of complex numbers and the activation of which the output (the gain) changes depending on the argument of complex numbers.

Note 12: The linear calculation performed by the processing circuit may include a process in which a bias term is fixed to 0.

Note 13: The linear calculation performed by the processing circuit may include a complex convolution.

Note 14: The medical data may be magnetic resonance data.

Note 15: The medical data may be ultrasound data.

Note 16: A data processing device provided according to an aspect of the present disclosure includes: a processing circuit configured to apply a linear calculation of a complex number coefficient and a non-linear activation not dependent on an argument of complex numbers, to magnetic resonance data having a complex value.

Note 17: A medical data processing method provided according to an aspect of the present disclosure includes: applying a linear calculation of a complex number coefficient and a non-linear activation not dependent on an argument of complex numbers, to medical data having a complex value.

Note 18: A medical data acquisition processing device provided according to an aspect of the present disclosure includes: a processing circuit configured to receive medical image data comprising complex values, process said medical image data using a neural network to produce processed medical image data; and output said processed medical image data.

The neural network may comprise a linear layer and a non-linear activation layer, the linear layer being configured to apply a linear calculation of a complex number coefficient and the non-linear activation layer being configured to provide a non-linear activation not dependent on an argument of complex numbers.

Note 19: The complex values may relate to phase information.

Note 20: A data processing device provided according to an aspect of the present disclosure includes: a processing circuit configured to receive medical image data comprising complex values, process said medical image data using a neural network to produce processed medical image data; and output said processed medical image data.

The neural network may comprise a linear layer and a non-linear activation layer, the linear layer being configured to apply a linear calculation of a complex number coefficient and the non-linear activation layer being configured to provide a non-linear activation not dependent on an argument of complex numbers.

Note 21: A medical data processing method provided according to an aspect of the present disclosure includes: receiving medical image data comprising complex values, processing said medical image data using a neural network to produce processed medical image data; and outputting said processed medical image data.

The neural network may comprise a linear layer and a non-linear activation layer, the linear layer being configured to apply a linear calculation of a complex number coefficient and the non-linear activation layer being configured to provide a non-linear activation not dependent on an argument of complex numbers.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical data processing device, comprising:
a processing circuit configured to apply, to medical data having a complex value, (1) a linear calculation that uses a complex number coefficient, and (2) a non-linear activation function of a neural network, wherein the activation function is not dependent on an argument of a complex number input into the neural network, the medical data being obtained by processing a signal received from a medical image diagnosis apparatus,
wherein the processing circuit includes the neural network having the non-linear activation function, the neural network outputting output medical data in response to the complex-valued medical data being input to the neural network, and wherein the linear calculation performed by the processing circuit includes a process in which a bias term is fixed to zero.

2. The medical data processing device according to claim 1, wherein the non-linear activation function is a function including a real variable function related to an absolute value of the input complex number.

3. The medical data processing device according to claim 2, wherein the non-linear activation function is a function obtained by multiplying the real variable function by the input complex number.

4. The medical data processing device according to claim 2, wherein the real variable function included in the non-linear activation function is one of a soft-shrink function, a tanh-shrink function, a power function, and a ReLU function.

5. The medical data processing device according to claim 1, wherein the non-linear activation function is a function of which an output value is zero when an input value thereto is zero.

6. The medical data processing device according to claim 1, wherein the processing circuit is further configured to apply the non-linear activation function based on a plurality of mutually-different function systems, to the medical data.

7. The medical data processing device according to claim 1, wherein the processing circuit is further configured to apply the non-linear activation further to the medical data, by using a plurality of functions which that are based on a mutually same function system and of which function parameters are mutually different.

8. The medical data processing device according to claim 1, wherein
the processing circuit is further configured to optimize a function parameter related to the non-linear activation function.

9. The medical data processing device according to claim 1, wherein the processing circuit is further configured to apply another activation function in which an output changes depending on the argument of the input complex number.

10. The medical data processing device according to claim 9, wherein the processing circuit is further configured to sequentially apply the non-linear activation function that is not dependent on the argument of the input complex number, and the another activation function in which the output changes depending on the argument of the input complex number.

11. The medical data processing device according to claim 9, wherein the processing circuit is further configured to selectively apply the non-linear activation function that is not dependent on the argument of the input complex number and the another activation function in which the output changes depending on the argument of the input complex number.

12. The medical data processing device according to claim 1, wherein the linear calculation performed by the processing circuit includes a complex convolution.

13. The medical data processing device according to claim 1, wherein the medical data is magnetic resonance data.

14. The medical data processing device according to claim 1, wherein the medical data is ultrasound data.

15. The medical data processing device of claim 1, wherein the medical data is data obtained from scanning a subject using the medical image diagnosis apparatus,
wherein the processing circuit is further configured to cause a display to display the output medical image that is output from the neural network and corresponding to the subject.

16. The medical data processing device of claim 1, wherein the medical image diagnosis apparatus is one of an ultrasound scanner, a Magnetic Resonance Imaging (MRI) scanner, and a Position Emission Tomography (PET) scanner.

17. The medical data processing device of claim 1, wherein the neural network is a program incorporated in the processing circuit, which is incorporated into one of an ultrasound scanner, a Magnetic Resonance Imaging (MRI) scanner, and a Position Emission Tomography (PET) scanner.

18. A data processing device, comprising:
a processing circuit configured to apply, to magnetic resonance data having a complex value, (1) a linear calculation that uses a complex number coefficient, and (2) a non-linear activation function of a neural network, wherein the activation function is not dependent on an argument of a complex number input into the neural network, the magnetic resonance data being obtained by processing a signal received from a magnetic resonance imaging apparatus,
wherein the processing circuit includes the neural network having the non-linear activation function, the neural network outputting output medical data in response to the complex-valued medical data being input to the neural network, and
wherein the linear calculation performed by the processing circuit includes a process in which a bias term is fixed to zero.

19. A medical data processing method comprising:
applying, by a processing circuit, to medical data having a complex value, (1) a linear calculation that uses a complex number coefficient, and (2) a non-linear activation function of a neural network, wherein the activation function is not dependent on an argument of a complex number input into the neural network, the medical data being obtained by processing a signal received from a medical image diagnosis apparatus,
wherein the processing circuit includes the neural network having the non-linear activation function, the neural network outputting output medical data in response to the complex-valued medical data being input to the neural network, and
wherein the linear calculation performed by the processing circuit includes a process in which a bias term is fixed to zero.

* * * * *